(12) United States Patent
Mota Toledo et al.

(10) Patent No.: US 11,194,842 B2
(45) Date of Patent: Dec. 7, 2021

(54) METHODS AND SYSTEMS FOR INTERACTING WITH MOBILE DEVICE

(71) Applicant: Samsung Electronics Company, Ltd., Suwon si (KR)

(72) Inventors: Selene A. Mota Toledo, Palo Alto, CA (US); James Young, San Francisco, CA (US); Ruokan He, San Francisco, CA (US); Sajid Sadi, San Jose, CA (US)

(73) Assignee: SAMSUNG ELECTRONICS COMPANY, LTD., Suwon (KR)

( * ) Notice: Subject to any disclaimer, the term of this patent is extended or adjusted under 35 U.S.C. 154(b) by 270 days.

(21) Appl. No.: 16/127,144

(22) Filed: Sep. 10, 2018

(65) Prior Publication Data
US 2019/0220471 A1 Jul. 18, 2019

Related U.S. Application Data

(60) Provisional application No. 62/619,024, filed on Jan. 18, 2018.

(51) Int. Cl.
*G06F 16/00* (2019.01)
*G06F 16/28* (2019.01)
(Continued)

(52) U.S. Cl.
CPC .......... *G06F 16/287* (2019.01); *G06F 16/245* (2019.01); *G06F 16/26* (2019.01);
(Continued)

(58) Field of Classification Search
CPC .... G06F 16/287; G06F 16/245; G06F 16/906; G06F 16/26; G06F 16/904; G06N 20/00
See application file for complete search history.

(56) References Cited

U.S. PATENT DOCUMENTS

| 7,555,427 B2 | 6/2009 | Kirshenbaum |
| 9,414,197 B2 | 8/2016 | You |

(Continued)

FOREIGN PATENT DOCUMENTS

| KR | 10-1625757 | 5/2016 |
| KR | 10-1639617 | 7/2016 |
| KR | 10-1659975 | 9/2016 |

OTHER PUBLICATIONS

Frieder Ganz et al., "Automated Semantic Knowledge Acquisition From Sensor Data", Sep. 2016, IEEE, vol. 10, No. 3, pp. 1214-1225 (Year: 2016).*

(Continued)

*Primary Examiner* — Jared M Bibbee
(74) *Attorney, Agent, or Firm* — Baker Botts L.L.P.

(57) ABSTRACT

In one embodiment, the system receives unlabeled data from one or more sensors. The one or more sensors are associated with a computing device of a user. The system clusters the unlabeled data into one or more unlabeled clusters. The system determines, based on one or more rules, at least one label for at least one unlabeled cluster of the one or more unlabeled clusters. The system expands, by a natural language processing algorithm, the at least one label for the at least one unlabeled cluster to produce one or more semantic terms associated with the at least one unlabeled cluster. The system generates, based on the one or more semantic terms, a personalized graph associated with one or more behavioral patterns of the user.

20 Claims, 35 Drawing Sheets

(51) Int. Cl.
  *G06N 20/00* (2019.01)
  *G06F 16/245* (2019.01)
  *G06F 16/26* (2019.01)
  *G06F 16/906* (2019.01)
  *G06F 16/904* (2019.01)

(52) U.S. Cl.
  CPC .......... *G06F 16/904* (2019.01); *G06F 16/906* (2019.01); *G06N 20/00* (2019.01)

(56) References Cited

U.S. PATENT DOCUMENTS

| | | | | |
|---|---|---|---|---|
| 2012/0265816 | A1* | 10/2012 | Picault | G06Q 30/02 709/204 |
| 2013/0339433 | A1* | 12/2013 | Li | H04N 21/4756 709/204 |
| 2014/0133663 | A1* | 5/2014 | Grokop | G10L 17/00 381/56 |
| 2015/0005030 | A1* | 1/2015 | Pennanen | G06N 20/00 455/556.1 |
| 2015/0081715 | A1* | 3/2015 | Okura | G06F 40/30 707/739 |
| 2015/0154447 | A1* | 6/2015 | Wilson | A63F 13/211 382/103 |
| 2015/0161439 | A1 | 6/2015 | Krumm | |
| 2015/0234813 | A1* | 8/2015 | Knapp | G06F 16/14 707/722 |
| 2016/0275196 | A1* | 9/2016 | Lee | G06F 16/24522 |
| 2017/0017928 | A1 | 1/2017 | Miller | |
| 2017/0185869 | A1* | 6/2017 | Dua | G06K 9/52 |
| 2018/0121500 | A1* | 5/2018 | Reschke | G06F 16/243 |

OTHER PUBLICATIONS

Vivi Nastase et al., "A survey of graphs in natural language processing", Sep. 10, 2015, pp. 665-697 (Year: 2015).*

* cited by examiner

300A

DMS: Degrees, Minutes, Seconds

Table 1

| i | $N_i$ | $N_1$ | $N_2$ | $N_3$ | $N_4$ | $N_5$ | $N_6$ | $N_7$ | $N_8$ | $N_9$ | $N_{10}$ | $N_{11}$ | $N_{12}$ | $N_{13}$ | $N_{14}$ | $N_{15}$ | $N_{16}$ | $N_{17}$ |
|---|---|---|---|---|---|---|---|---|---|---|---|---|---|---|---|---|---|---|
| 0 | 380 14th Street | 1.00 | 0.30 | 0.06 | 0.27 | 0.11 | 0.06 | 0.13 | 0.09 | 0.24 | 0.14 | 0.17 | 0.11 | 0.18 | 0.21 | 0.12 | 0.10 | 0.32 | 0.24 |
| 1 | The Cafe Dance Club | 0.30 | 1.00 | 0.09 | 0.00 | 0.12 | 0.22 | 0.13 | 0.10 | 0.15 | 0.16 | 0.05 | 0.11 | 0.06 | 0.10 | 0.10 | 0.05 | 0.12 | 0.24 |
| 2 | 1120 San Mateo Dr | 0.06 | 0.09 | 1.00 | 0.16 | 0.06 | 0.08 | 0.11 | 0.20 | 0.13 | 0.23 | 0.15 | 0.10 | 0.27 | 0.17 | 0.09 | 0.11 | 0.40 | 0.30 |
| 3 | Mau | 0.27 | 0.00 | 0.16 | 1.00 | 0.09 | 0.47 | 0.09 | 0.05 | 0.28 | 0.09 | 0.15 | 0.23 | 0.07 | 0.30 | 0.16 | 0.27 | 0.40 | 0.13 |
| 4 | SF Party | 0.11 | 0.12 | 0.06 | 0.09 | 1.00 | 0.35 | 0.09 | 0.18 | 0.13 | 0.09 | 0.36 | 0.16 | 0.07 | 0.11 | 0.22 | 0.05 | 0.14 | 0.40 |
| 5 | Samsung Global Innovation | 0.06 | 0.22 | 0.08 | 0.47 | 0.35 | 1.00 | 0.09 | 0.31 | 0.13 | 0.20 | 0.09 | 0.16 | 0.04 | 0.32 | 0.06 | 0.40 | 0.36 | 0.40 |
| 6 | Stanford Owl | 0.13 | 0.13 | 0.11 | 0.09 | 0.09 | 0.39 | 1.00 | 0.12 | 0.44 | 0.29 | 0.40 | 0.30 | 0.34 | 0.16 | 0.36 | 0.07 | 0.09 | 0.51 |
| 7 | Shell | 0.09 | 0.10 | 0.20 | 0.05 | 0.18 | 0.31 | 0.12 | 1.00 | 0.19 | 0.15 | 0.12 | 0.12 | 0.12 | 0.11 | 0.08 | 0.10 | 0.06 | 0.18 |
| 8 | Chipotle Mexican Grill | 0.24 | 0.15 | 0.13 | 0.28 | 0.13 | 0.44 | 0.38 | 0.19 | 1.00 | 0.11 | 0.34 | 0.13 | 0.08 | 0.36 | 0.16 | 0.22 | 0.32 | 0.24 |
| 9 | Bow Wow Meow | 0.14 | 0.16 | 0.23 | 0.09 | 0.09 | 0.26 | 0.29 | 0.15 | 0.11 | 1.00 | 0.34 | 0.12 | 0.11 | 0.13 | 0.16 | 0.02 | 0.71 | 0.37 |
| 10 | Tender Greens Palo Alto | 0.17 | 0.05 | 0.15 | 0.15 | 0.36 | 0.40 | 0.40 | 0.12 | 0.34 | 0.34 | 1.00 | 0.20 | 0.17 | 0.30 | 0.05 | 0.38 | 0.11 | 0.39 |
| 11 | Philz Coffee | 0.11 | 0.11 | 0.10 | 0.23 | 0.16 | 0.08 | 0.30 | 0.12 | 0.13 | 0.12 | 0.20 | 1.00 | 0.17 | 0.36 | 0.05 | 0.40 | 0.12 | 0.37 |
| 12 | 1000-1008 Bryant St | 0.18 | 0.06 | 0.27 | 0.07 | 0.04 | 0.34 | 0.12 | 0.12 | 0.08 | 0.13 | 0.17 | 0.17 | 1.00 | 0.17 | 0.13 | 0.05 | 0.17 | 0.14 |
| 13 | Poke Love | 0.21 | 0.10 | 0.17 | 0.30 | 0.11 | 0.32 | 0.16 | 0.11 | 0.36 | 0.13 | 0.30 | 0.36 | 0.17 | 1.00 | 0.13 | 0.40 | 0.25 | 0.48 |
| 14 | Wilbur Field | 0.12 | 0.10 | 0.09 | 0.16 | 0.22 | 0.40 | 0.36 | 0.08 | 0.16 | 0.16 | 0.05 | 0.05 | 0.12 | 0.13 | 1.00 | 0.22 | 0.12 | 0.18 |
| 15 | The Treehouse | 0.10 | 0.05 | 0.11 | 0.27 | 0.05 | 0.46 | 0.07 | 0.10 | 0.22 | 0.02 | 0.38 | 0.40 | 0.05 | 0.40 | 0.22 | 1.00 | 0.31 | 0.30 |
| 16 | IKEA | 0.32 | 0.12 | 0.40 | 0.40 | 0.14 | 0.40 | 0.09 | 0.06 | 0.32 | 0.71 | 0.11 | 0.12 | 0.17 | 0.25 | 0.12 | 0.31 | 1.00 | 0.79 |
| 17 | Safeway | 0.24 | 0.24 | 0.30 | 0.13 | 0.40 | 0.51 | 0.18 | 0.24 | 0.37 | 0.90 | 0.36 | 0.37 | 0.14 | 0.48 | 0.18 | 0.30 | 0.79 | 1.00 |

*FIG. 28*

Table 2

| r | ϕr |
|---|---|
| 1 | 0.0000 |
| 2 | 0.0000 |
| 3 | 0.0000 |
| 4 | 0.0002 |
| 5 | 0.0003 |
| 6 | 0.0001 |
| 7 | 0.572 |
| 8 | 0.291 |
| 9 | 0.351 |
| 10 | 0.468 |
| 11 | 0.468 |
| 12 | 0.610 |
| 13 | 0.377 |
| 14 | 0.377 |
| 15 | 0.350 |
| 16 | 0.976 |
| 17 | 0.148 |

*FIG. 29*

METHODS AND SYSTEMS FOR INTERACTING WITH MOBILE DEVICE

PRIORITY CLAIM

This application claims the benefit, under 35 U.S.C. § 119(e), of U.S. Provisional Patent Application No. 62/619,024 filed 18 Jan. 2018, which is incorporated herein by reference.

TECHNICAL FIELD

This disclosure generally relates to on-device systems for interacting with mobile devices and data.

BACKGROUND

For machine-learning algorithms, one way to get better performance is to provide the algorithm more data. The data may be manually labeled by users or may be collected from a user's mobile device and uploaded to a cloud server. However, obtaining labeled data can be a very expensive, tedious, and resource-intensive task. Furthermore, servers containing the user data are often controlled and owned by a private organization, which could raise concerns about the user's privacy.

A mobile device may obtain data from a heterogeneous network of sensors. Difficulty arises when attempting to compare and combine analysis(es) derived from vastly different sensors (also known as "sensor fusion") since each sensor may capture different data modalities and have dissimilar types of statistical properties. Sensor fusion algorithms may use sensor ontological infrastructure and communications to address this issue, for example, through Semantic Web in environments like World Wide Web (WWW). World Wide Web Consortium (W3C) has set standards for formats involving diversely sourced data and has addressed the language standard for how this data relates to the real world. However, for the mobile environment, the existing infrastructure and communication channels do not apply. Machine learning may be used for sensor data encoding (e.g., joint feature identification) using techniques such as k nearest neighbors (KNN) or sparse-PCA for feature detection within a single sensor modality. For multimodal features, Restricted Boltzmann Machines and Deep Multimodal Encoding have been used to identify joint features and estimate missing or discontinuous data. However, these methods are all time-consuming, resource-intensive, and require server infrastructures to run. Furthermore, these methods create challenges on mobile devices and raise privacy concerns about the user data.

BRIEF DESCRIPTION OF THE DRAWINGS

FIGS. 28 and 29 illustrate two tables including the numerical parameters and results.

DESCRIPTION OF EXAMPLE EMBODIMENTS

Figure 1A:
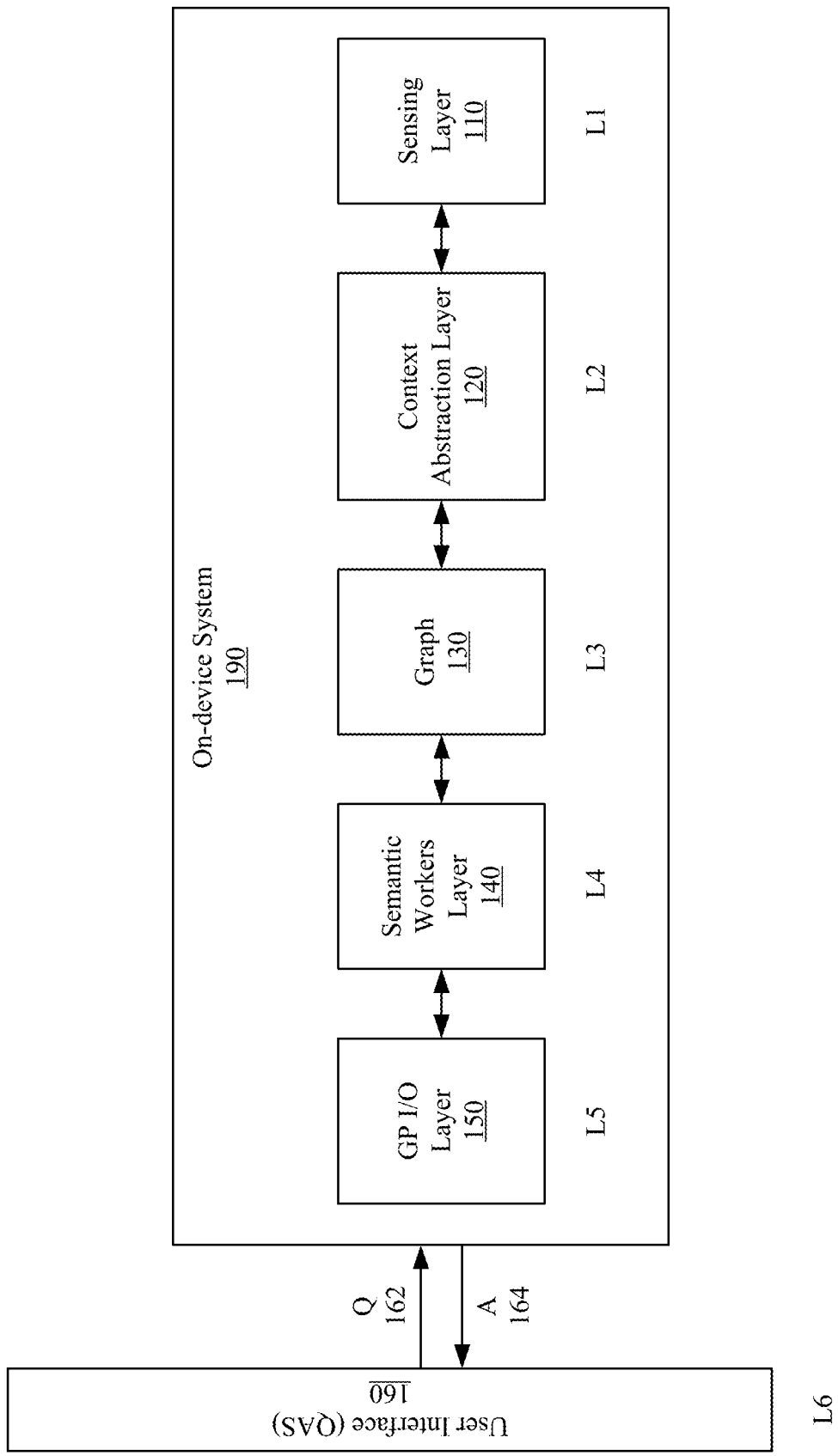
FIGS. 1A-B illustrate an example system diagram for interacting with mobile devices.

In particular embodiments, the system disclosed herein may combine unsupervised machine learning techniques, semantic network architectures, and principles of adaptive learning and learn from unlabeled data over time in an offline manner while keeping user information private. As more data is being gradually collected, the built-in machine learning algorithms within the system are able to learn from data and generate a personalized model of the user's behavior over time as the user interacts with their mobile device.

A typical daily cell phone usage is about 459 minutes for males and 600 minutes for females. In particular embodiments, the system may use cell-phone-usage data as an incoming source of unlabeled data to learn from the data in a pseudo-continuous manner because of the frequent physical attachment most users have with their cell phones. Such unlabeled data may be tagged via information provided by the surrounding context, which, in turn, may be inferred via built-in mobile phone sensors sampling in the background in an adaptive manner. As a result, the system can infer a personalized model of the user's behavior without being explicitly provided labeled data. The system may exploit the existing sensor capabilities on mobile devices to build a model that may be used to provide personalized and contextualized information to the user, even in an offline manner. The system may only rely on the mobile device platform and therefore, protects the privacy of the user's data.

In particular embodiments, the system disclosed herein may have two main layers including a sensor fusion layer and a semantic layer. The sensor fusion layer may use unsupervised learning techniques based on hierarchical clustering and multi-level modeling to extract features from raw sensor data and fuse them progressively to produce a sensor model in real time, in a semi-online fashion. Then, the semantic layer may use the sensor model to generate a graphical semantic model which may be then indexed via a spatial-temporal framework, and its semantic labels may be generated directly from contextual rules (which may be used to initialize and super-impose priors for the next layer of the system). Subsequently, the graphical model produced by the semantic layer may be semantically expanded by using a generic dictionary of terms. This semantic expansion takes place on the user's mobile phone and its indexing (e.g., using nodes and edges) may be generated in correspondence to the user's patterns of observed behavior. As a result, the system may obtain a personalized graphical probabilistic model of the user's behavior. In particular embodiments, this learned user model can be used as a portal that mediates and simplifies the interaction between users and their own data, as well as a wide variety of services, news aggregators, internet-of-things ("IoT") networks and devices populating the digital world to allow them to provide interactions that are more relevant, tailored, and personal to users.

Existing systems may achieve a comprehensive level of personalization only by requiring that the user grants access to all or a subset of the user's entire data repository. Granting third-party systems access to a user's data repository may raise deep privacy concerns and may provide little to no benefit to the user, especially when most of the user's transactions often involve simple direct searches, such as finding the nearest coffee shop, that don't inherently require third-party access to the user's data.

In particular embodiments, by having a personalized user model learned and living locally in the mobile device, the system may allow the user to interact with external services and devices existing in the digital world by sending specific requests to those services and devices and then only sharing relevant, non-sensitive information about the context or user for one or more specific period(s) of time, rather than sharing the user's entire data stream continuously. Thus, particular embodiments of the system may provide the user with the advantage of having a fully personalized experience, without having to pay the steep cost of giving up privacy. In other words, the system can mediate interactions with the digital world by firewalling or controlling the user's raw sensor data and only exposing the minimum level of information to the service that the user is interested to use.

Furthermore, in particular embodiments, the user could use the system as a portal to explore his/her own data and use the resulting insights as a mechanism to create his/her own solutions to needs that are relevant to him/her. In particular embodiments, one way to interact with the system may be through a question answering system (QAS), which provides the user interface (UI) to allow the user to navigate, access, and visualize his/her own information by simply asking questions of interest, or by formulating specific request(s) using speech and natural language.

In particular embodiments, the system may learn from data that is not currently available, data that is not labeled, data related to events that is hard to collect on demand (e.g., emotions or natural responses). Through these learnings, the system may generate a personalized user model in an offline manner continuously over time without needing to rely on a cloud server. The system may keep the personalized inferred model locally, exclusively on the user's device, allowing users to have full control and/or authority of their own data and allowing them to have a high-level of privacy. The system may provide users with high-level descriptions of their lives that can be used for self-exploration or be applied to a wide variety of applications for which personalization and tailoring of information are important. The system may provide data ontology for multimodal sensing with semantic graphs.

Particular embodiments of the system provide many advantages over previously existing systems. For example, the system doesn't depend on an external cloud database and is server free. The system learns the user model, and learning can be done offline. The system protects the user's privacy and, does not share sensor data to external service providers. The system analyses an extensive number and variety of data-stream types. The system automatically extracts knowledge not only from GPS data, but also other types of data provided by the mobile device's built-in sensors. The system identifies clusters not only in the spatial domain (like many of other existing techniques) but also in the temporal domain. The system uses machine learning algorithms that operate over compressed raw data to save computational resources by greatly reducing the dimensionality and density of the data and avoiding compressing and decompressing raw data every time a new calculation is performed. The system expands the initial semantic space built by the sensor data into another, richer semantic space by sampling multiple sources of knowledge. The system selects the appropriate source of knowledge based on the information learned as cluster types that are identified in real-time and on-the-fly. The system is easy to scale-up because of its offline, distributed architecture (modularized) and self-contained nature.

Particular embodiments of the system allow for better management of device resources, smarter models, lower latency, less power consumption, and better protection of user privacy. Particular embodiments of the system, in addition to providing an update to the shared model, provide an improved model on the user's phone can also be used immediately for powering personalized experiences in the way that the phone is used. The system may allow users to intuitively query multimodal sensor data with semantics. The query type may be the same as the data being queried, which is important for heterogeneous sensor networks. The system may build complex associations via a connected graph, and the graphical nature of the semantic sensor fusion layer may allow users to explore more complex associations. Particular embodiments of the system may use graph databases which are schema-less to allow high flexibility correlating and searching data. The graph databases may be inherently non-relational and may not require SQL duplicate storage for performing joint operations or many of the expensive search and match operations required for finding relationships.

Figure 1B:
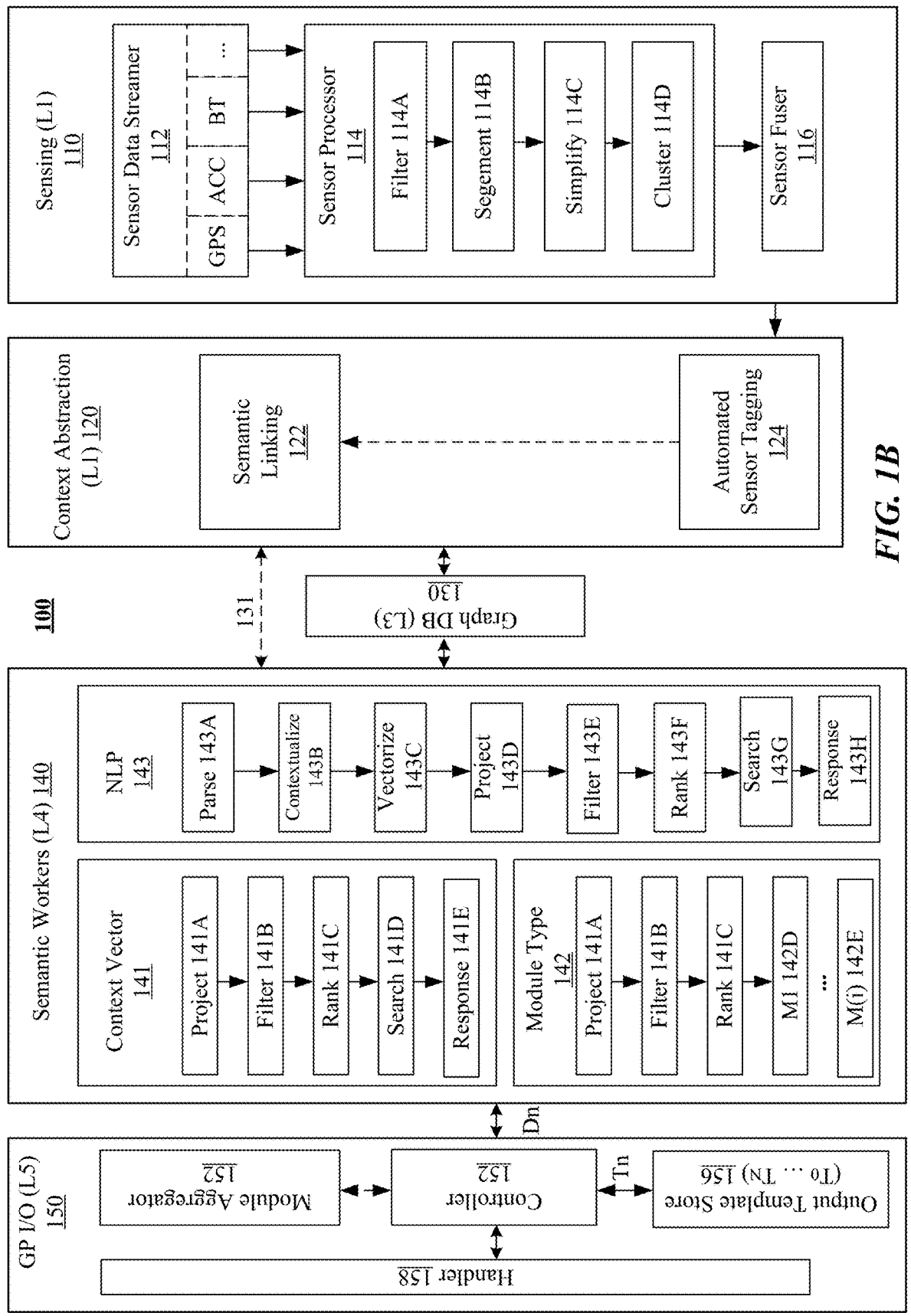

FIGS. 1A-B illustrate an example system diagram 100 for interacting with mobile devices. In particular embodiments, the on-device system 190 may be referred as a Sense+ system. In particular embodiments, the system 190 may include multiple layers including a sensing layer 110 (Layer 1), a context abstraction layer 120 (Layer 2), a graph layer 130 (Layer 3), a semantic workers layer 140 (Layer 4), a GP I/O layer 150 (Layer 5), and may be associated with a user interface layer (e.g., a QAS) 160 (Layer 6). The system 190 includes four core layers of specialized modules which perform the main processing to build a personalized model of the user. The system may operate across the core layers in order to provide intelligent semantic search functionality. The core layers may include the sensing layer 110, the context abstraction layer 120, the semantic workers layer 140, and the general-purpose input/output (GP I/O) layer 150. The user interface layer 160 may interconnect users and other layers of the system for delivering queries 162 and answers 164 between users and the mobile device. FIG. 1B illustrates the example system diagram 100 with detailed sub-modules which will be described in later sections.

Figure 2:
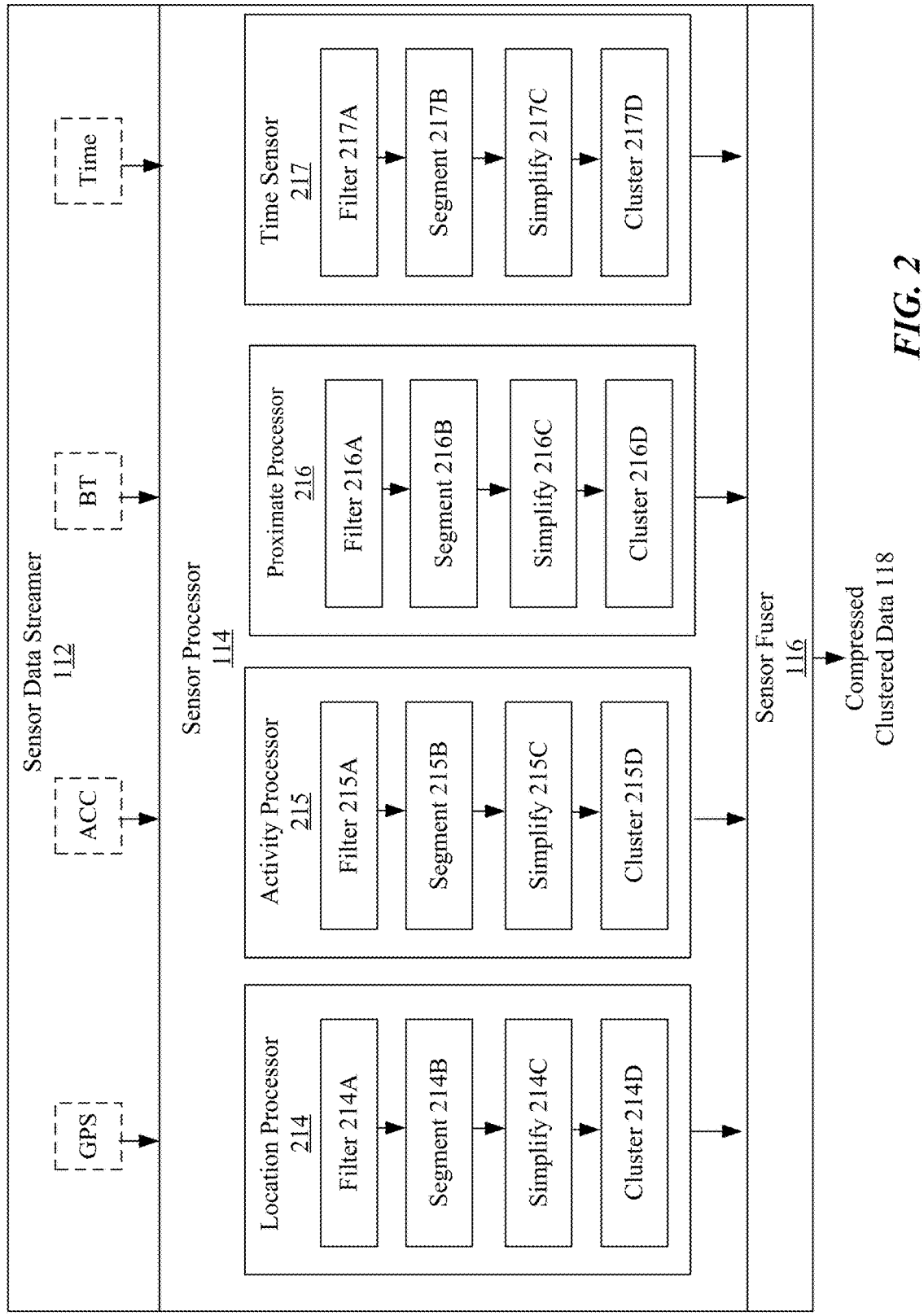
FIG. 2 illustrates example modules for a sensing layer of the system.

FIG. 2 illustrates example modules for the sensing layer 110 of the system. The sensing layer 110 may collect signals in real-time from built-in sensors (e.g., a GPS, accelerometers, Bluetooth sensors, etc.) of the mobile device or accessory sensors associated with the mobile device. The sensing layer 110 may convert the collected data (e.g., from the sensor data streamer 112) into clusters of fused sensor data (e.g., by a sensor fuser 116). These clusters of data may serve to aid the automated sensor-tagging module 124 (in FIG. 1B) embedded within the context abstraction layer 120 (in FIG. 1B) by feeding the context abstraction layer 120 (in FIG. 1B) with the clusters' descriptive features and properties extracted from the clusters of data. For example, a cluster's extracted features and properties may indicate if such cluster is a place where the user has recently been or if such cluster is a regularly followed transportation path. This first core layer of sensing layer may efficiently collect, process, and compress data streams generated by the user's mobile phone and convert them into spatial-temporal clusters. The spatial-temporal clusters may contain features and properties indicating location, trajectories, time events, and/or other critical points that can be used to automatically tag the clusters and attach semantic descriptions to the clusters when passed to the context abstraction layer 120 (in FIG. 1B).

Since the sensor data volume collected from a mobile device can be quite large, an efficient real-time compression of a large dataset is important for optimizing storage and quick access of the dataset. Traditional techniques for processing, compressing, and storing this type of data are usually disjointed from each other, resulting in a redundant amount of computational resources to compress and decompress the data each time information is extracted at different levels of granularity. However, translating massive amounts of raw sensor data (e.g., GPS) into clusters that contain useful semantic meaning is a challenging technical problem for multiple reasons. For example, compared to fields such as vision and text mining, less has been done about handling other forms of sensor datasets, both in theory and in practice. As another example, the amount of data can be extremely huge (e.g., a single smart phone can generate data on the order of 1 GB per day). Therefore, its compression and decompression processes may consume a considerable amount of computational resources. As another example, the training data for a given user is usually based on the usage of the mobile device by a particular user. Thus, for some users making much heavier use of certain services or apps, the generated data may be highly unbalanced and/or sparse datasets due to the variable amounts of samples (e.g., in some cases there will be abundant amounts of data; whereas in some other cases there will be only very few samples). As another example, even though mobile devices have improved their power efficiency, activities such as dense sampling, performing heavy computations, or keeping and updating frequent online connections may significantly increase power consumption. By using the system described herein, mobile devices may achieve significant gains in the computational efficiency and power consumption.

In particular embodiments, the system may segment and compress the data in a way that can be translated into a finite number of shapes, which can be contained in a predefined set of kernels (also referred as shape-dictionary). Therefore, sensor data coming from the sensor stream in real-time may be filtered (e.g., by filters 214A, 215A, 216A, 217A), segmented (e.g., by segment modules 214B, 215B, 216B, 217B), simplified to its minimal representation (e.g., by simplify modules 214C, 215C, 216C, 217C) and, subsequently, mapped to one of the kernels contained in the dictionary. Then, each of the identified shapes may be included a cluster through the clustering modules (e.g., 214D, 215D, 216D, 217D) after its features and properties are extracted. The data clusters may be fed into the sensor fuser 116 for sensor fusion. The sensing layer 110 may generate the compressed clustered data 118 based on the sensor fusion results.

Particular embodiments of the system process the sensor data streams using approaches that allow extracting data features and properties in a way that is simultaneously: (1) highly compressible, (2) compatible between layers of processing, and (3) directly usable when new features need to be computed or when low-level granularity data needs to be accessed or represented by another layer. As a result, unnecessary computational overload is avoided and system efficiency and speed are optimized for real-time computations.

In particular embodiments, the shape-dictionary can be built using two possible methods: (1) based on predefined shapes or kernels, or (2) built on-the-fly by automatically adding shapes or kernels each time that a new shape or kernel is encountered according with priors or matching rules imposing over the data. In particular embodiments, the first method may be better suited for sensor signals that have well-known geodesic properties (e.g., signals from the GPS sensor). In particular embodiments, the second method may be well suited for situations in which the properties of the sensor signal are not known in advance and need to be learned as the data is being captured. Particular embodiments of the system may use the approach described by the first method, the second method, or a combination of both methods depending on the nature of the signals that are collected by the system.

Figure 3A:
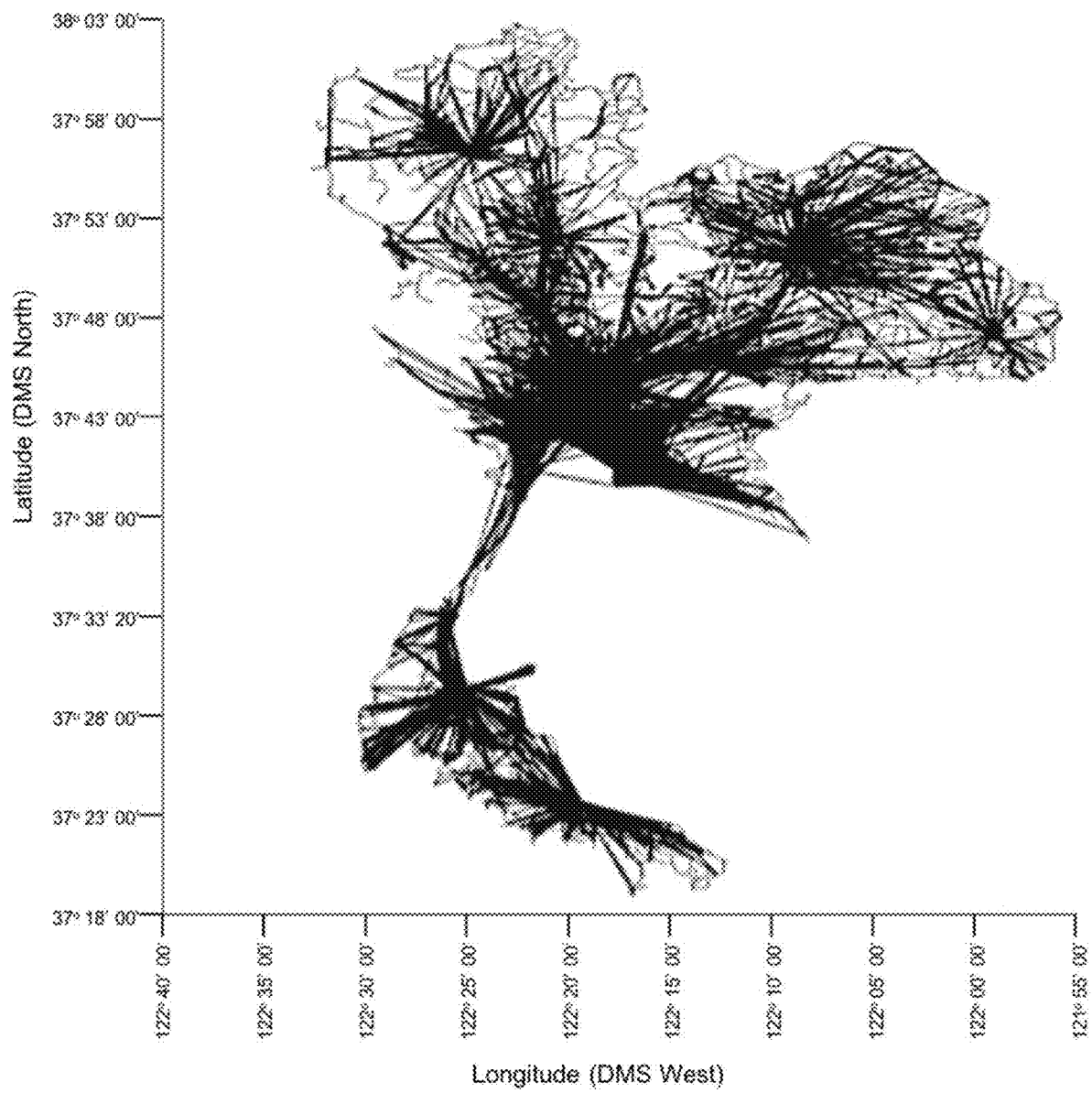
FIG. 3A illustrates a figure showing examples of observed raw data points and their trajectories sampled in the spatial domain.
Figure 3B:
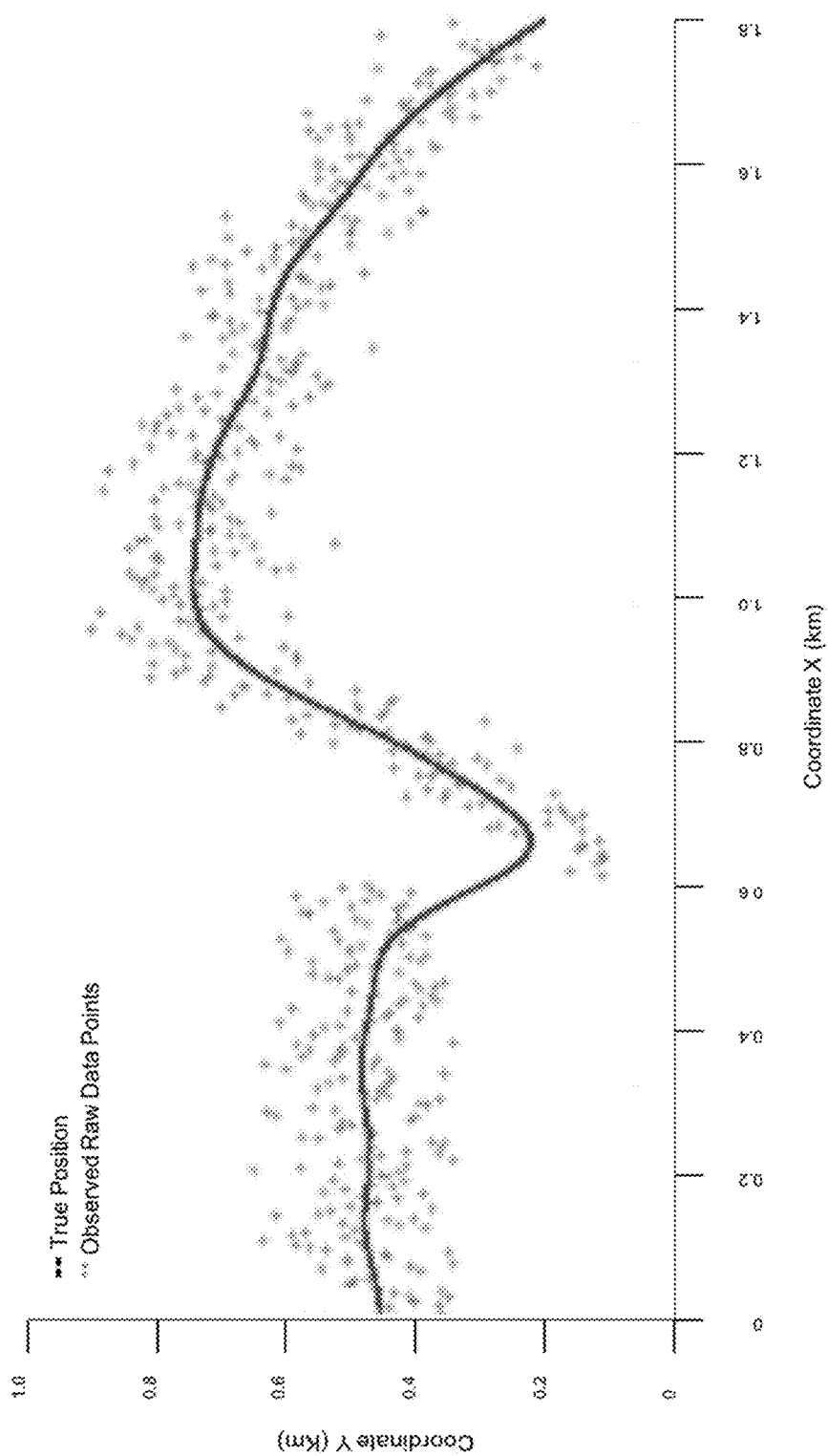
FIG. 3B illustrates a figure showing examples of raw data points and their estimated trajectory in the spatio-temporal domain.

FIG. 3A illustrates a FIG. 300A showing examples of observed raw data points and their trajectories sampled in the spatial domain. FIG. 3B illustrates a FIG. 300B showing examples of raw data points and their estimated trajectory sampled in the spatiotemporal domain. In particular embodiments, one of the challenges when mapping GPS coordinates to clusters with semantic meaning is that multiple places are often within a very short margin of error of the coordinates attached to a location. For example, a user might be in a shopping mall and the GPS coordinates received might indicate that the user is at a coffee shop when the user is really at a pharmacy next door. In particular embodiments, to reduce the error caused by the close margins between locations, the system may analyze the problem from the point of view of the law of large numbers. For example, the system may assume that the mean of the collection of GPS points sampled around a ground-truth position (e.g., the coffee shop) will become closer to the exact ground truth point over time.

However, if the variance of the noise is too large, and the user doesn't stay at the place long enough, the mean of the sample might still not be good enough for approximating and distinguishing which exact location the user visited. But, if the user goes to a particular location (e.g., the coffee shop) several times, the system may use these repeated visits over time to estimate the cluster that captures the ground truth point. Therefore, the cluster may be estimated from all the visits to particular locations and/or from a long enough stay in such locations. The clustering algorithm used by the system may recognize and cluster the points of these multiple visits over time. In particular embodiments, the general segments of the system, such as for the most visited roads or trajectories for going home, may use the same or similar principles, as described in later sections. As a result, based on the assumptions above, particular embodiments, of the system may have the initial processing step within the sensing layer to reduce the noise in the sensor data stream by using, e.g., a Gaussian-Filter defined by the following equation:

$$G(x, y) = \frac{1}{2\pi\sigma^2} e^{-\frac{x^2+y^2}{\sigma^2}} \quad (1)$$

The above equation may refer to the Gaussian function for calculating the transformation for filtering GPS data, where sigma ($\sigma$) refers to the standard deviation, $\sigma^2$ refers to the variance, x is a vector containing the values corresponding to the GPS latitude coordinate, and y is a vector containing the values corresponding to the GPS longitude coordinate. For simplicity of description, the vectors x and y may be represented together as pairs of coordinates which are denoted by the vector n(x, y, t). Thus, each element or instance of the vector n may be referred to as $n_i(x, y, t)$, which represents a single data point $(x_i, y_i)$ contained within the GPS sensor data stream captured at a particular point in time ($t_i$).

One of the purpose of this Gaussian filter is to remove noise by smoothing the signal and removing the high frequency component of the signal produced by the environmental noise. For example, in GPS signals, noise may be caused while the user moves by different forms of transportation and/or road conditions. The degree of smoothness of the filter may depends on the chosen value of the standard deviation. In this disclosure, particular embodiments of the system may use high normalized smooth widths (between 0.5 and 1.0) since the system may require the Gaussian curve to be weighted more at the center and have reduced weights towards the edges, rather than to be uniformly weighted. Particular embodiments of the system may not need to accurately compute the true estimation of the data at this stage given that this is the first level of processing and assuming that other kinds of noise will be encountered within the signal (e.g., segment outliers as described in the later sections). For this reason, particular embodiments of the system may have the Gaussian filter to offer a simple and fast method to extract the data stream main characteristics using limited computational resources.

After removing noise, the next step may be to segment the $n_i(x, y, t)$ GPS points into linear segments. In particular embodiments, the segmentation step may include two main sub-steps including linear simplification and outlier elimination. Using the maximum likelihood estimation (MLE) method, the system may partition the data into k-segments (K<<N) by minimizing the sum of square distances from the raw incoming data points (e.g., using a sliding window $W_t$ based on the density of the sensor data stream). As a result, the optimization problem of interest may become the computation of the k-segment mean, which may be the k-piecewise function that minimizes the cost (minimum sum of squared regression distances) to the points among all possible k-segments in the vicinity. Then, for each k partition that contains $N_k$ number of points $p_j$, the system may choose the alternative $S_k * p_j$ (projection of $p_j$ on estimated line segment $S_k$) that has the highest likelihood (i.e. finding $p_j$ for which the likelihood $L(S_k)$ is highest).

Figure 4A:
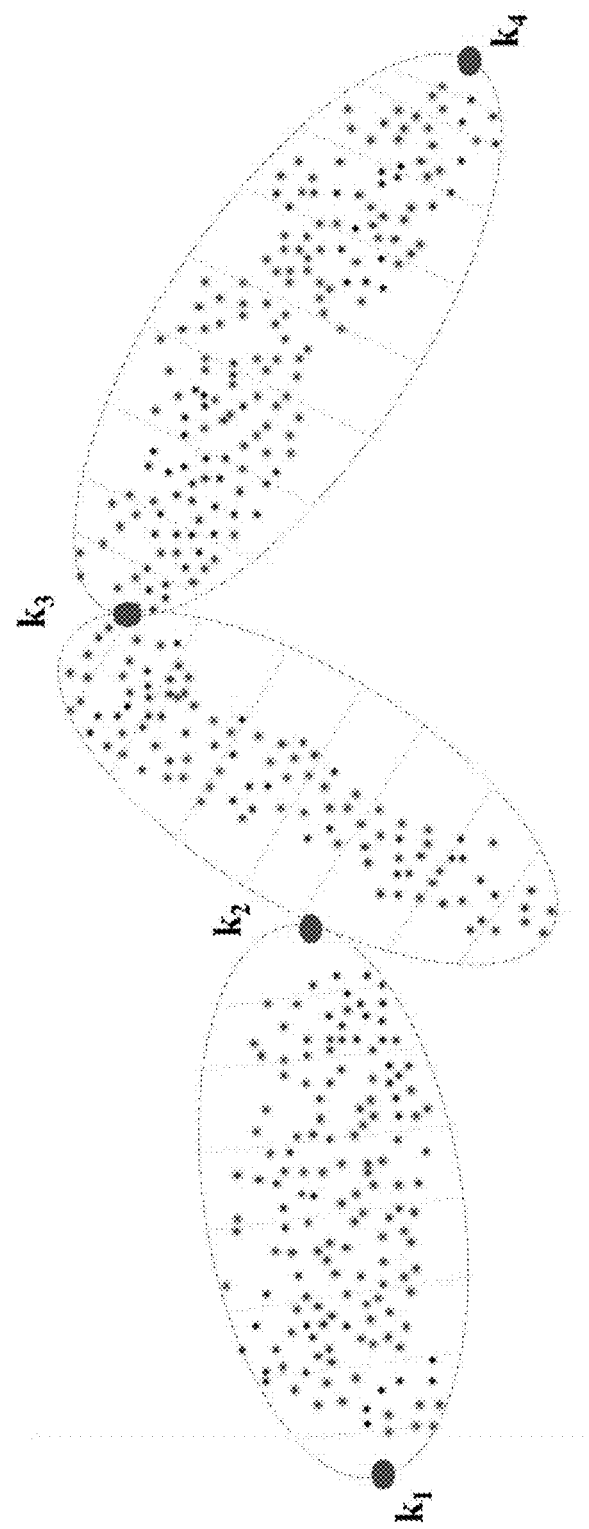
FIG. 4A illustrates a figure showing examples of observed raw data points partitioned into k-segments.
Figure 4B:
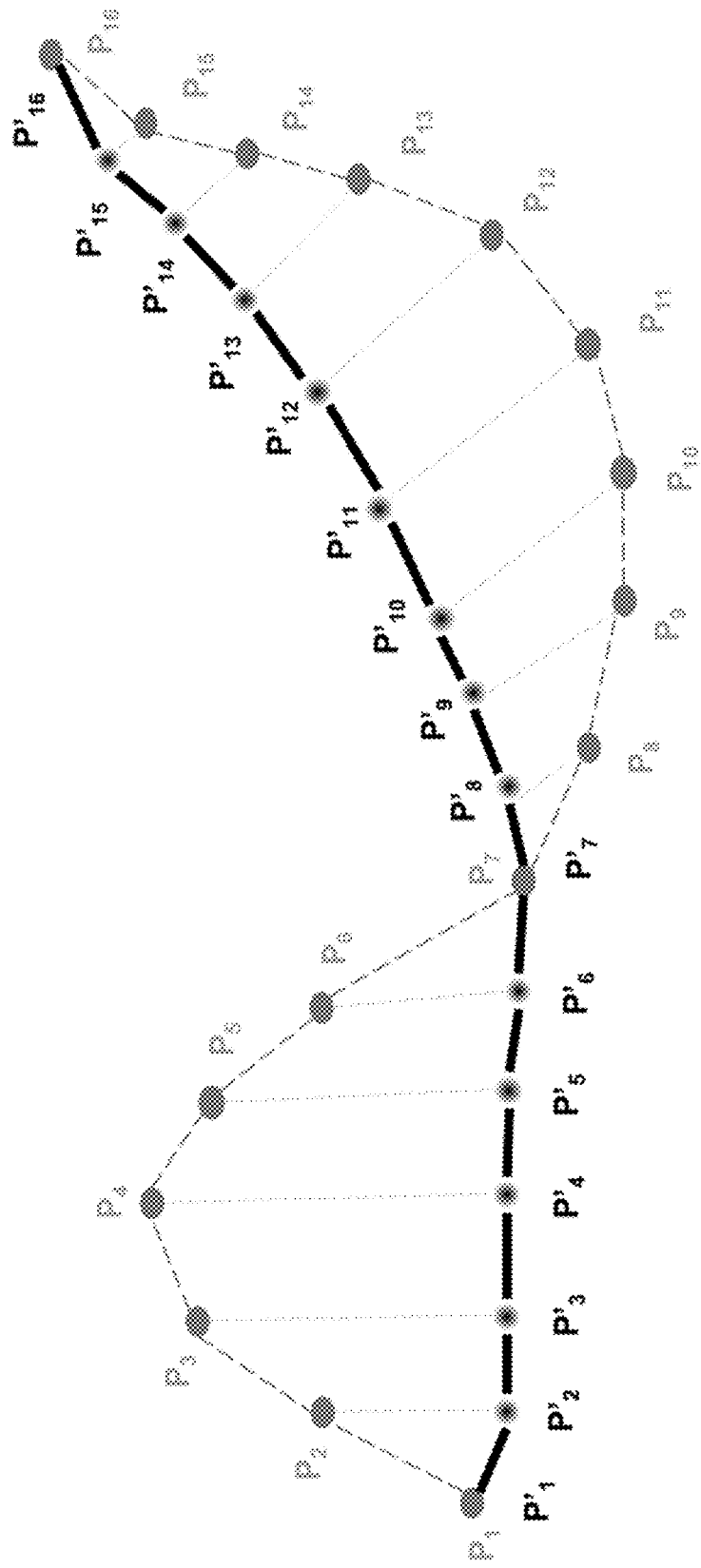
FIG. 4B illustrates a figure showing examples of sampled data points contained within one k-segment ($P_1$-$P_{16}$) and their approximation to a linear function using a maximum-likelihood estimator.
Figure 4C:
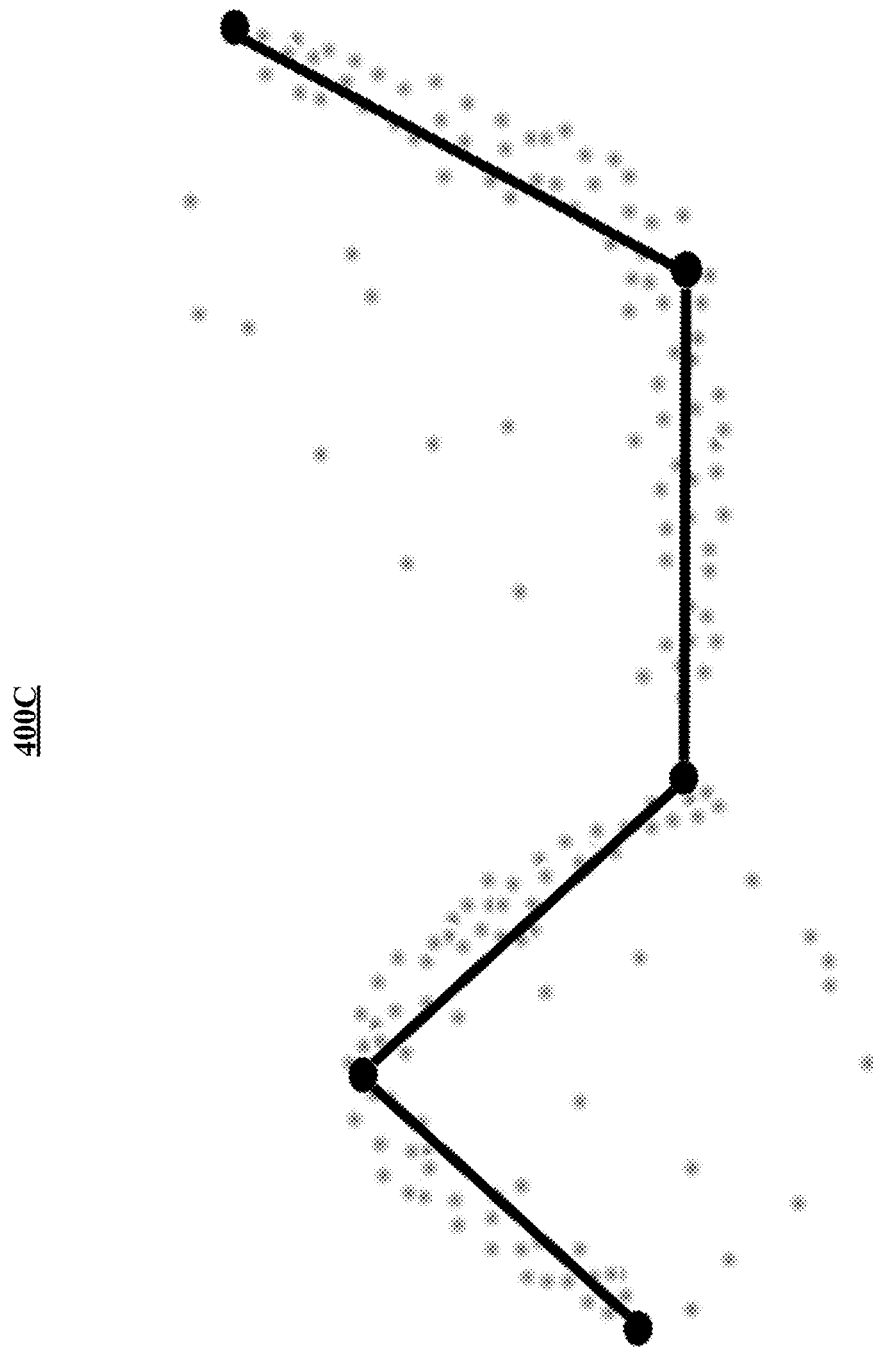
FIG. 4C illustrates a figure showing an example of maximum-likelihood estimates computed from four k-segments of observed raw data.
Figure 4D:
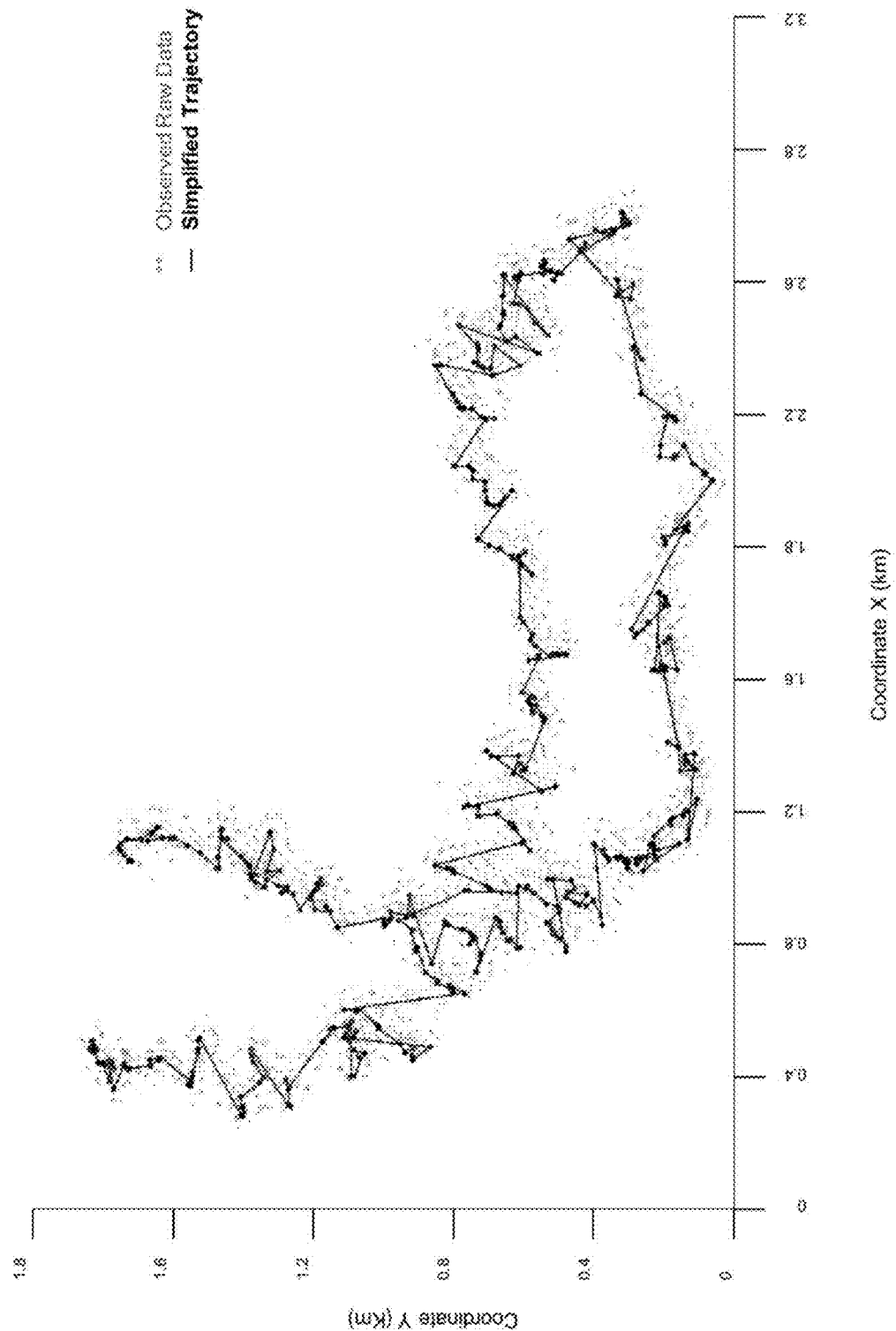
FIG. 4D illustrates a figure showing an example of maximum-likelihood estimates aggregated over time from observed raw data.

FIG. 4A illustrates a FIG. 400A showing examples of observed raw data points partitioned into k-segments. FIG. 4B illustrates a FIG. 400B showing examples of sampled data points contained within one k-segment ($P_1$-$P_{16}$) and their approximation to a linear function using a maximum-likelihood estimator. FIG. 4C illustrates a FIG. 400C showing an example of maximum-likelihood estimates computed from four k-segments of observed raw data. FIG. 4D illustrates a FIG. 400D showing an example of maximum-likelihood estimates aggregated over time from observed raw data. In particular, for N independent observations $n_1, \ldots, n_i, \ldots, n_N$, the likelihood function of the point $p_j$ (in where $p_j \in n_i(x,y,t) \in N$) may be described by the following equation:

$$L(\theta) = \Pi_{j=1}^N P(p_j; \theta) \quad (2)$$

wherein, $P(p_j;\theta)$ is the probability-mass function modeled by a time synchronized Euclidean distance function; $\theta$ is the set of parameters for the function $S_k$ (e.g., a line) that maximizes the likelihood $L(\theta)$ is denoted by $\theta$ and called the maximum likelihood estimate of $\theta$; E is the approximate error caused by the noise in the signal for which $E = P_{true} - P_{GPS}$; K represents the set of all projected k-segments, each of which corresponds to one partition $S_k$, where K<<N.

Figure 4E:
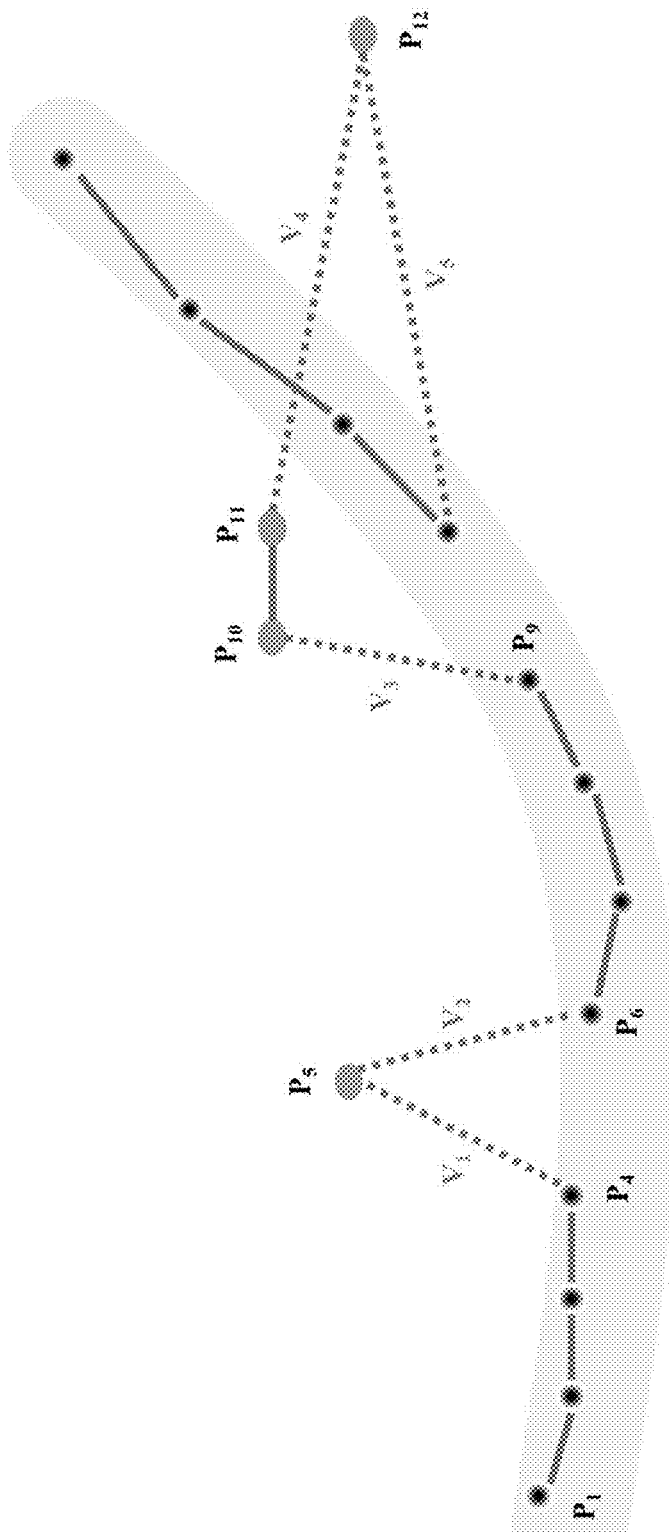
FIG. 4E illustrates a figure showing examples of outlier data points removed from one k-segment.

FIG. 4E illustrates a FIG. 400E showing examples of outlier data points (e.g., $p_5, p_{10}, p_{11}, p_{12}$) removed from one k-segment. After segments $S_k$ are detected, the outliers in those segments may be removed using an outlier detector based on analyzing the segment connectivity with the following assumptions: (1) The number of outliers may be much smaller than the number of actual sensed points. (2) By considering the time domain, the speed of each point may be inferred by $$V_j = \frac{distance_j}{time_j}$$

providing information about how the point moves. (3) The $p_i$ points with segments larger than a threshold $V_x$ are cut-off or assigned to be disconnected.

Figure 5:
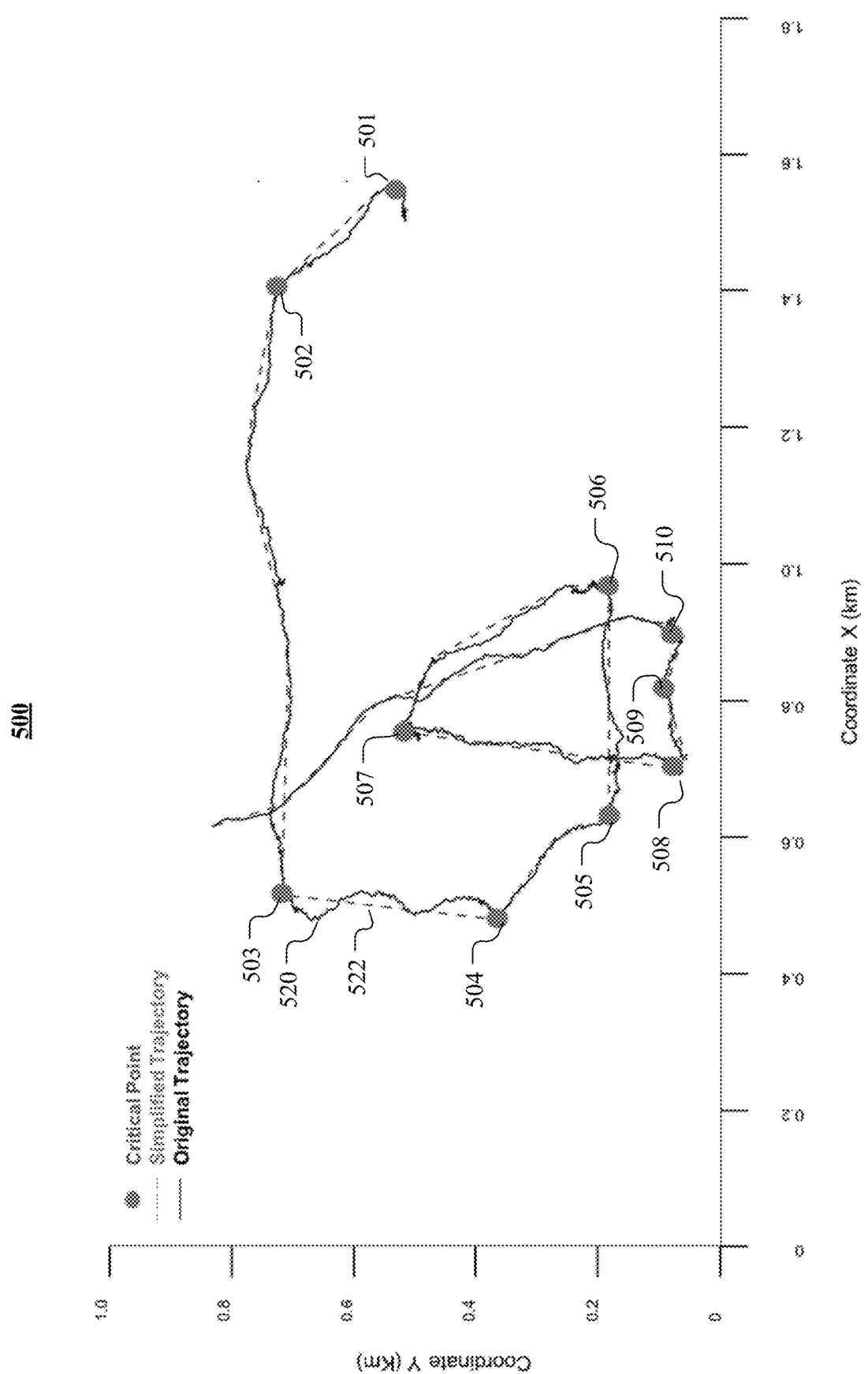
FIG. 5 illustrates a figure showing examples of critical points extracted from a simplified trajectory.

FIG. 5 illustrates a FIG. 500 showing examples of critical points (501, 502, 503, 504, 505, 506, 507, 508, 509, 510) extracted from the simplified trajectory 522. In particular embodiments, the critical points may be the turning points of the path 520 identified from the sensor data. Once extracted, these critical points may be used to determine the match of these segments with shapes in the shape dictionary. In particular embodiments, once the sensor data stream is segmented into k-segments, the next step may be to approximate the segmented sensor data to one of m geometric shapes contained in the dictionary. Given the nature of the location data, it may be assumed that k-segments found within the signal may repeat and that each segment may be a translation in time of the m<<k-segments in the space. To match the segments to the geometric shapes, the (k, m)-segment may be a k-segment within the set of segments K that minimizes the sum of squared regression distances of the raw sensor data points $p_j$ within the segment $S_k$, with the added constraint that the projection of the k-segment onto the (x, y)-space (e.g., geographical location ignoring time and speed) is one of a set of m-segments predefined in the dictionary of shapes M, in which M<<K. The result may be a set of matched (k,m)-segments equal to or smaller than the size of K.

The problem of real-time clustering is technically challenging, for example because (1) the patterns to be clustered are not known in advance and (2) the time interval of such patterns is arbitrary. In particular embodiments, differently from the traditional K-Means or DBSCAN algorithms, the system may process sensor data streams in real-time to generate coded sequences (e.g., sequences of geometric shapes generated by the previous sensing layer) and identify the most recurrent paths and places that contribute to the estimation of priors for the different types of clusters in the space and time domains. Most traditional techniques rely on having a good initialization of cluster priors or a uniform distribution of data point samples across the entire dataset and, in such cases, clusters are computed offline or initialized using a model during the system cold-start. However, by following such processes, the traditional algorithms mainly focus on finding patterns within the space domain while most of the information on the temporal domain gets lost.

In contrast, by operating on the sequences of compressed shape-coded data, particular embodiments of the system described in this disclosure greatly speed up the recursion involving the finding of the sensor data clusters. This is mainly due to the fact that the number of coded data points is significantly smaller than the original number of raw data points (M<<K<<N). In other words, particular embodiments of the system may have clustering algorithms operating on compressed data (e.g., sequences of shapes or kernels built by critical points), which dramatically reduces the dimensionality of the optimization problem and offers a significantly shorter running time. These advantages and properties may be especially important for the type dataset that the system may handle. The data points produced by the mobile device built-in sensors may arrive one-by-one over long periods of time in a continuous manner. This fact makes it impractical or difficult to save such massive amounts of data offline, especially because of the phone's built-in memory capacity constraints. Instead, particular embodiments of the system may use a merge-and-reduce technique to achieve efficient clustering for the streaming sensor signals in real-time. Even though the system may not be using a parallel computing architecture in some embodiments, this technique can be applied and fully taken advantage of when using multiple processor cores in parallel since the data coming from the sensor stream can be divided in multiple partitions and each partition can be computed separately in parallel or by multiple threats. For example, each thread can filter, segment, and compute the sequences of shapes in parallel resulting in even further reduction for the algorithm running time.

In particular embodiments, the clustering algorithm may search for duplicated patterns within the coded shapes or kernel sequences in the time-domain. Then, the system may apply a Huffman coding step to keep track of the most frequently used patterns as well as the infrequent ones. For each frequent pattern, a shorter bit sequence may be assigned, whereas for infrequent patterns, a longer bit sequence may be assigned. After the bit codes are assigned, the bit values may be re-arranged using a shuffler filter. In particular embodiments, the shuffle filter may not compress data as such, but instead may change the byte ordering of the data. For example, the first byte of each value may be stored in the first chunk of the data stream and the second byte may be stored in the second chunk, and so on. The data ordered in this way may be used to facilitate finding the autocorrelation in the data stream since data that are close in value tend to appear close and improve the reliability of the cluster detection by eliminating possible noise in the time domain, similar to the cases where two places are in a very close proximity.

The operation and design of the system platform described herein are illustrated in FIGS. 1A-B for architecture and stack diagrams. The sensing layer of the architecture may produce clusters (nodes) of essentially compressed sensor data. These clusters may be the relevant semantic attachment points for the upper layers of this architecture. The cluster may be referred as sensor clusters including different sensor information, for example, but not limited to, Bluetooth addresses, environmental audio sources, or accelerometer features, etc. Sensor clusters may be used as the nodes in the Sense+ graph database and may have a type defined by their sensor type. For example, GPS clusters may have a type of "Location." These sensor clusters may a sensor database containing a compressed set of sensor points and associated timestamps. For more detailed information about a specific sensor cluster, the system may allow the user to access to the sensing layer raw data saved on the mobile device in a relational database. The system may access the data in the databases and interpret the accessed data. Since the sensor clusters may come from many different types of sensors, the interpretation of the accessed data may include a sensor fusion process.

In particular embodiments, the context abstraction layer may process the sensor fusion using semantic linking. The various sensors may each contribute clusters and a separate entity may assign semantic meanings to the clusters. These semantic meanings may each be independent and may be added as separate pieces to the final non-relational database. The semantic meanings may include words and may be referred as concepts. In some embodiments, a concept may be always linked to a sensor cluster through an edge. As a result, the final graph database structure may be in the form of a directed graph.

The previously existing semantic tagging algorithms are limited by using reverse-geo-coding based on cloud service. In particular embodiments, the system expands and dramatically enriches the system semantic-space by using one or more ecologies of external services including multiple services, for example, but not limited to, Foursquare, Google businesses database, US census address book, and/or Google transit database, etc. In particular embodiments, before proceeding with automated semantic tagging, the system may use the cluster types identified in the clustering step to designate and further refine which is the best database(s) to use to perform the reverse-geocoding. For example, by identifying if the cluster is a transit route or a place, the system may choose to reverse geocode from the Google transit database versus from the business or address databases. In addition, the tagging can come via the tags provided not only by the reverse-geocoding technique but also by other sensing modules such as the activity detection, the object tracking, the time sensing, or the rule-based-reasoning modules, etc. As a result, all these alternative sources of automated sensor tagging greatly enrich the generation of semantic tags that builds and, subsequently, expands the system's semantic-space.

In particular embodiments, semantic linking may occur when the same concept links two or more sensor clusters. One of the goals of semantic linking is to match query input to the database store. The query may arrive in the form of a weighted list of terms. The sensor database may contain many different types of data including raw values, timestamps, clusters, cluster statistics, etc. Particular embodiments of the system may use a multi-step process to determine which data type to search for and which sensor type to include in the search. By using semantic linking as the basis of fusion, various sensors may be fused via the same data type that queries are composed of and similar terms they are querying with. This can drastically reduce the complexity of a querying architecture, which is very important for mobile applications. Thus, if a user (e.g., computer or human) is querying the graph database, the user may simply need to query relevant semantics and any associated sensor clusters may be 1-degree separated. If there is a case where multiple identical concepts are attached to the same sensor cluster, then the weight (i.e., value attached to the edge) may also be increased. The weight may an edge attribute and may be used later for static node ranking.

In particular embodiments, the system information may be stored in a custom mobile graph database (L3). The custom mobile graph database may contain nodes, node attributes, edges, and edge attributes. Both the nodes and edge elements may have a type. The edge and node attributes may be in the form of a key-value pair, with the key representing the type of attribute and the value indicating the attribute. The implementation of this graph database is described in later sections as it pertains to the system platform.

Figure 6:
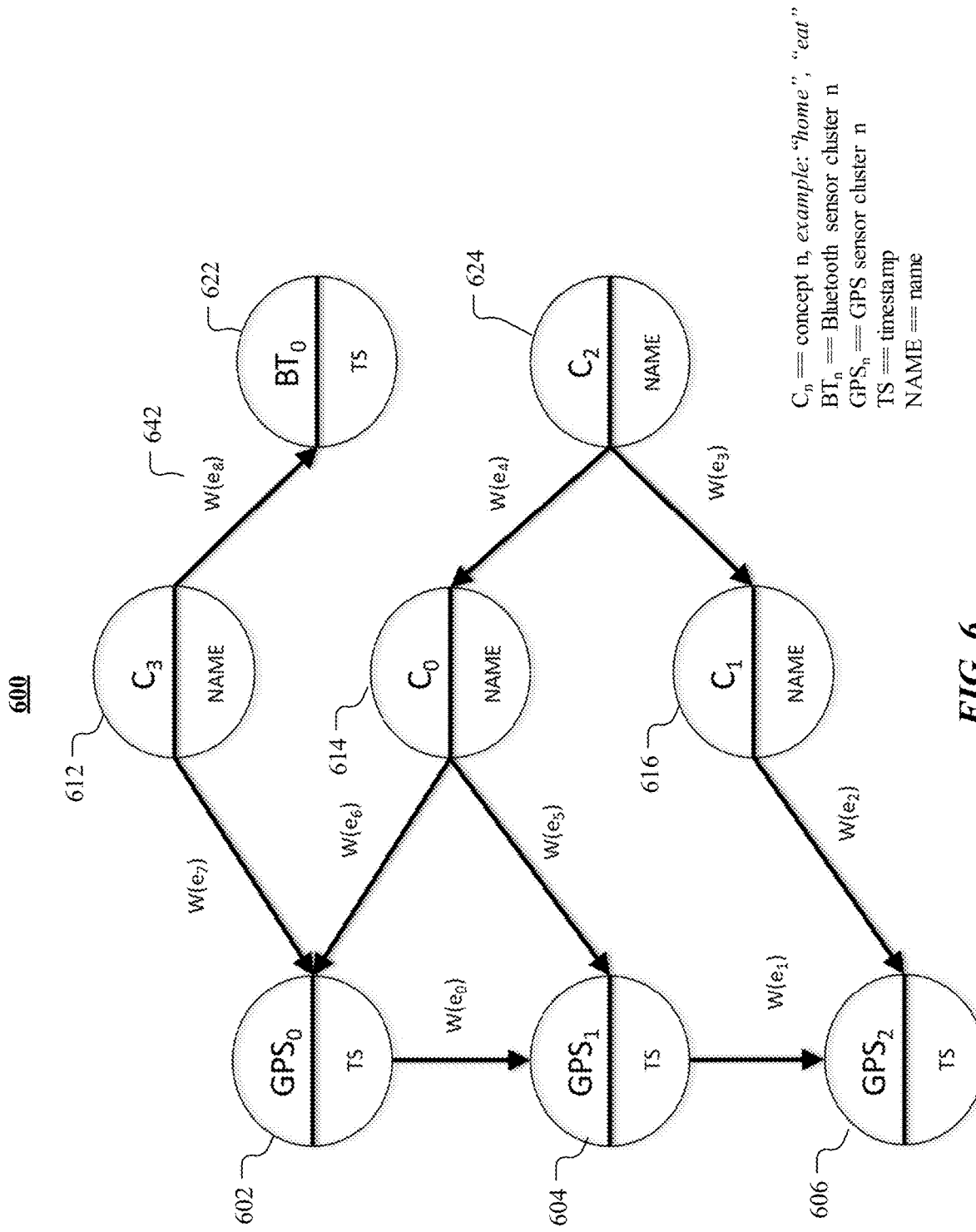
FIG. 6 illustrates an example data graph generated based on sensor data.

FIG. 6 illustrate an example data graph 600 generated based on sensor data. The data graph 600 may include a number of sensor nodes (e.g., GPS sensor nodes 602, 604, 606, Bluetooth sensor node 622) and a number of concept nodes (e.g., concept nodes 612, 614, 616, 624). The concept node 614 may be built based on multiple sensor nodes (602, 604). The concept node 624 may be built based on other concept nodes (614, 616). A concept node may have a name identification and may be associated with a particular concept (e.g., activities, locations, routes, behaviors). A sensor node may be associated with one or more sensor data clusters and may have a sensor type (e.g., GSP or Bluetooth sensor) and a time stamp. The sensor nodes and concept nodes may be connected by edges (e.g., 642). Both sensor nodes and concept nodes may be dynamically generated and included in the data graph. The edges connecting the nodes may indicate the semantic relationship between the connected nodes. Each edge of the data graph may be associated with a weighting factor w. The weighting factor of the edge may indicate the relative confidence and relevancy of relationship between the nodes connected by the edge. The weighting factor may dynamically change over time depending on the relevancy of the nodes. For example, the weighting factor of two highly relevant concepts nodes may have value of 1 and may be reduced to 0 while the two concepts nodes gradually become irrelevant over time.

In particular embodiments, the system may use the data graph to dynamically determine user activities, actions, and behavior patterns. In particular embodiments, the system may use the data graph to determine complex activities of a user based on the sensor data related to that user. The system may have knowledge (e.g., data characteristics) about basic and general activities (e.g., running, sleeping, working, driving vehicle) of the user. This knowledge about basic activities may be learned from pre-labeled data or automatically labeled data by machine learning (ML) algorithms. The system may analyze the available sensor data (for example, location data, proximity sensor data, moving speed data) and determine the user's activities based on the sensor data, the knowledge of basic activities, and/or one or more rules.

As an example and not by way of limitation, the system may determine, using GPS sensors, that the user has left home and arrives at a particular location. The system may determine, through a map, that the user's current location is at a soccer field. The system may detect that the user moves back and forth within the soccer field and the user's heart rate is very high. The system may determine that the user is playing soccer at this soccer field even though it is the first time that the system detects the user visiting this location.

As another example, the system may detect that the user is at a restaurant. The system may detect that it is about dinner time and the user stays at the restaurant for a decent amount of time. The system may determine that the user is eating dinner that this restaurant. The system may further use pictures (e.g., food pictures, receipt pictures) that the user taken with their mobile device to determine the food content (e.g., fish, vegetables) of the user. The system may further monitor the interaction (e.g., laughter) between the user and some other people (e.g., friends dinning together) around the user to determine whether the user likes this restaurant. The system may collect all this data and store it in the data graph. The information may be used for, e.g., recommending a restaurant to the user at a later time. As another example, the system may detect that the user goes to a café and walks to a coffee station. After that, the system may detect that the user walks around socializing with different people. The system may infer that the user is drinking coffee with friends and may store all related data (e.g., drinking coffee, time, location, time duration) in the data graph.

As another example, in response to a user request for recommending places to buy flowers, the system may access the data graph and determine that the user has previously bought some flowers in a shop on the way home. The system may determine that the flower shop will be open at the time when the user normal drives home after work. The system may recommend that flower shop as the place to buy flowers when the user drives home after work. The system may generate customized recommendation fitting into the normal routine of the user. As another example, in response to a user request for recommending restaurants for dinning with friends, the system may access the data graph and determine a recommendation based on dinning histories, current locations, preferences, and other information of the user and the user's friends.

Figure 7:
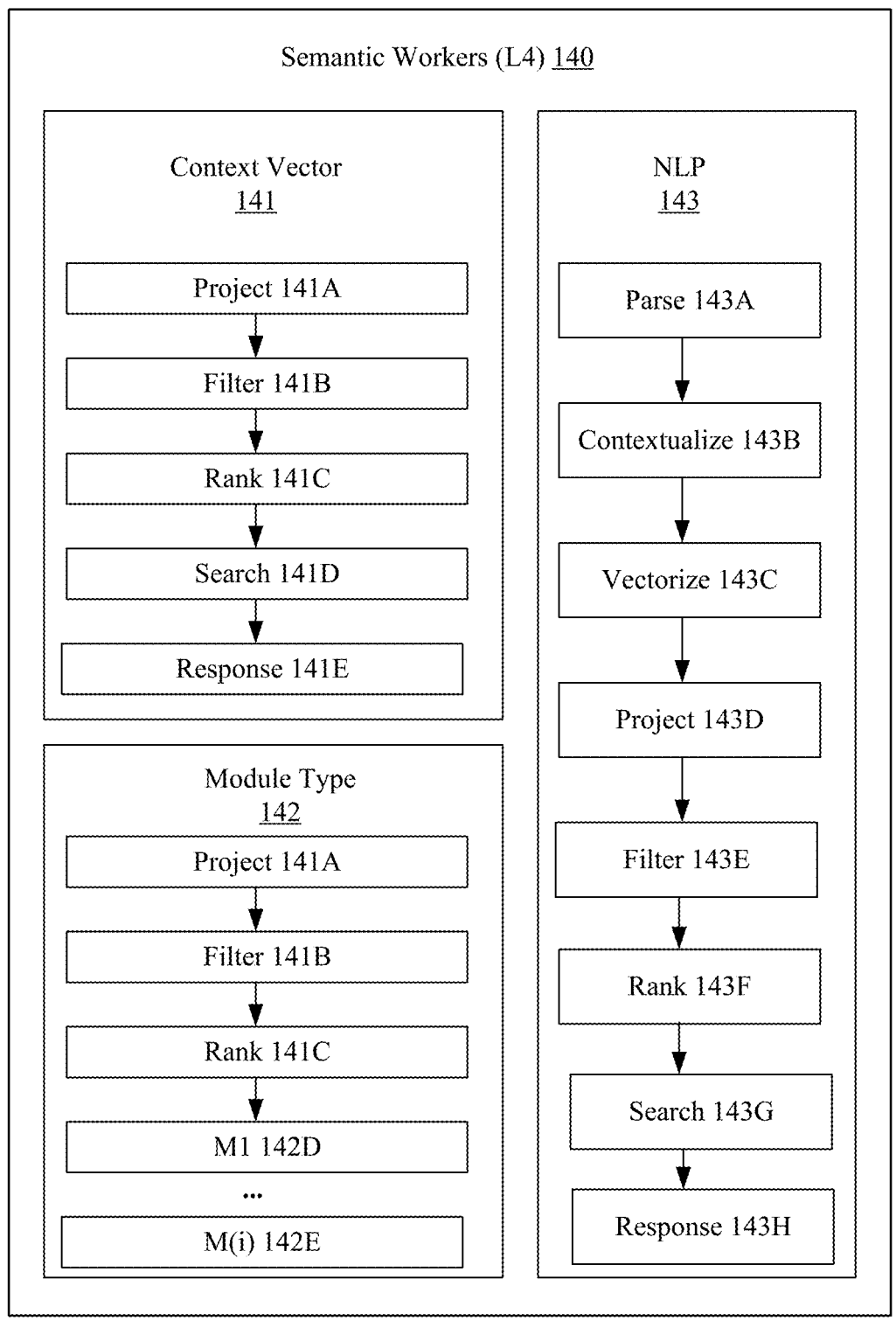
FIG. 7 illustrates an example diagram for sub-modules of the semantic-workers layer of the system.

FIG. 7 illustrates an example diagram 700 for sub-modules (e.g., 141, 143) of the semantic workers layer 140 of the system. Besides the graph database contained in the graph database layer (L3), the system's semantic database may include a large dictionary of possible semantics associated with a given sensor cluster. If a user (e.g., human or computer) would like to access this database, the user may need a way to map an input query onto the semantic database. The query method may be (1) general enough to allow for limited-data matching, and (2) specific enough to retrieve actual answers to questions. The query process may be carried out by a series of modules that map the query to a relevant sorting mechanism.

Figure 11:
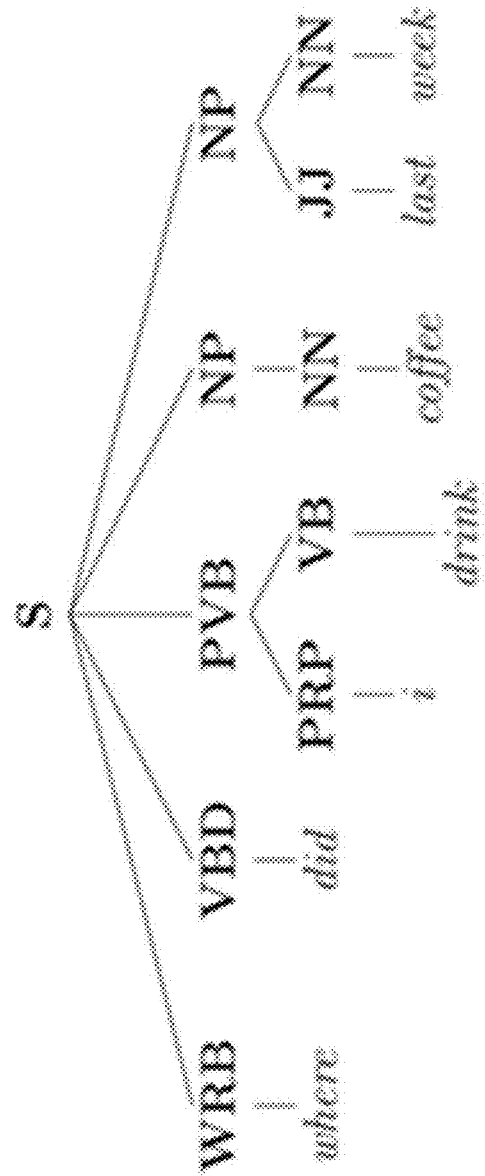
FIG. 11 illustrates an example non-projective tree structure.

In particular embodiments, the system may convert input text into a data object using a parse model 143A. The system may structure an unstructured query input to identify the important and necessary parts. The result of parsing may be a language graph (either projective or non-projective). In particular embodiments, the system may have an architecture to convert raw text stream to a structured language object in many forms. In particular embodiments, the system may process the input text and form a non-projective language tree. This method may require a part-of-speech tagging procedure. Generally, this procedure may begin with one of many downloadable corpora including, for example, but not limited to, words, part-of-speech tags, dialogue tags, syntactic trees, and/or possibly many other pieces of information. Input text may be assigned a part-of-speech either through a language model(s) trained from one of these annotated corpora. Another important part of this step may be referred as "chunking." The user may define prosodic grammar-structures for the input structure of the query to assign additional elements in a language tree. This may be the stage where query type may be pre-defined heuristically. The language tree may be similar to regular expressions and can be a quick way to heuristically pre-tag important segments of a query for quick matching in later steps. An example of this type of parse is shown in FIG. 11.

Figure 10:
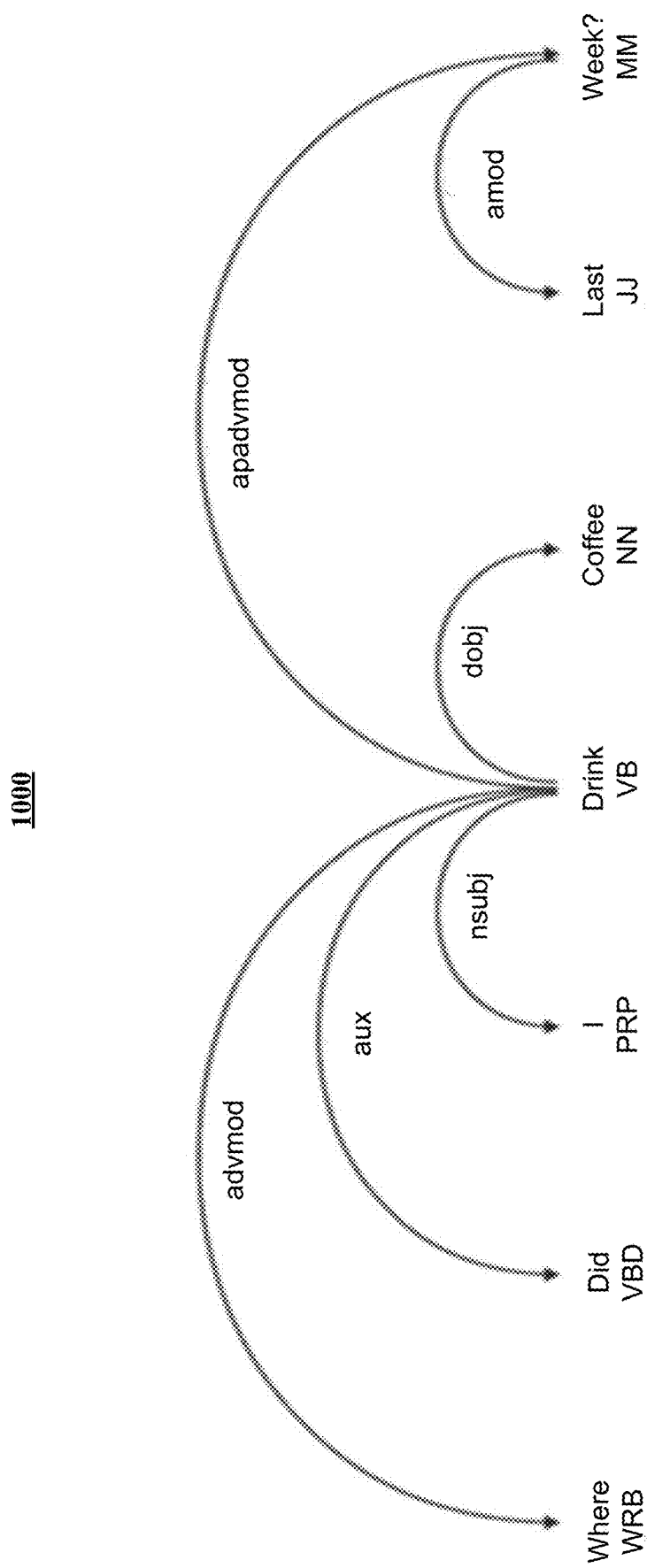
FIG. 10 illustrates an example projective tree structure.

In particular embodiments, the system may use a different way to perform this step by forming a projective language dependency graph, which may be a head-dependent structured graph. The system may assume that along with a root node with no incoming edges there is at most one incoming directed edge (except the root) for each language-component node, and there is a unique path from the root to any node in the graph. This method may also use a piece of graph formalism referred as projectivity. The dependency graph assumptions above may imply a head-dependency path exists for every language component (node) in the language graph (except the root). The edge may be projective if there is a path between the head and every node (language component) between it and its dependents. If all the edges have this property, then the graph be referred as projective. An example of this type of parse is shown in FIG. 10.

Particular embodiments of the system may implement both methods described above on the Sense+ platform. In some cases, the directed-acyclic graph (projective dependency parsing) may be primarily utilized for several reasons including: (1) a complete traversal algorithm being reduced from NP-hard; (2) input queries being simple sentences, not documents with complex relationships.

Figure 8:
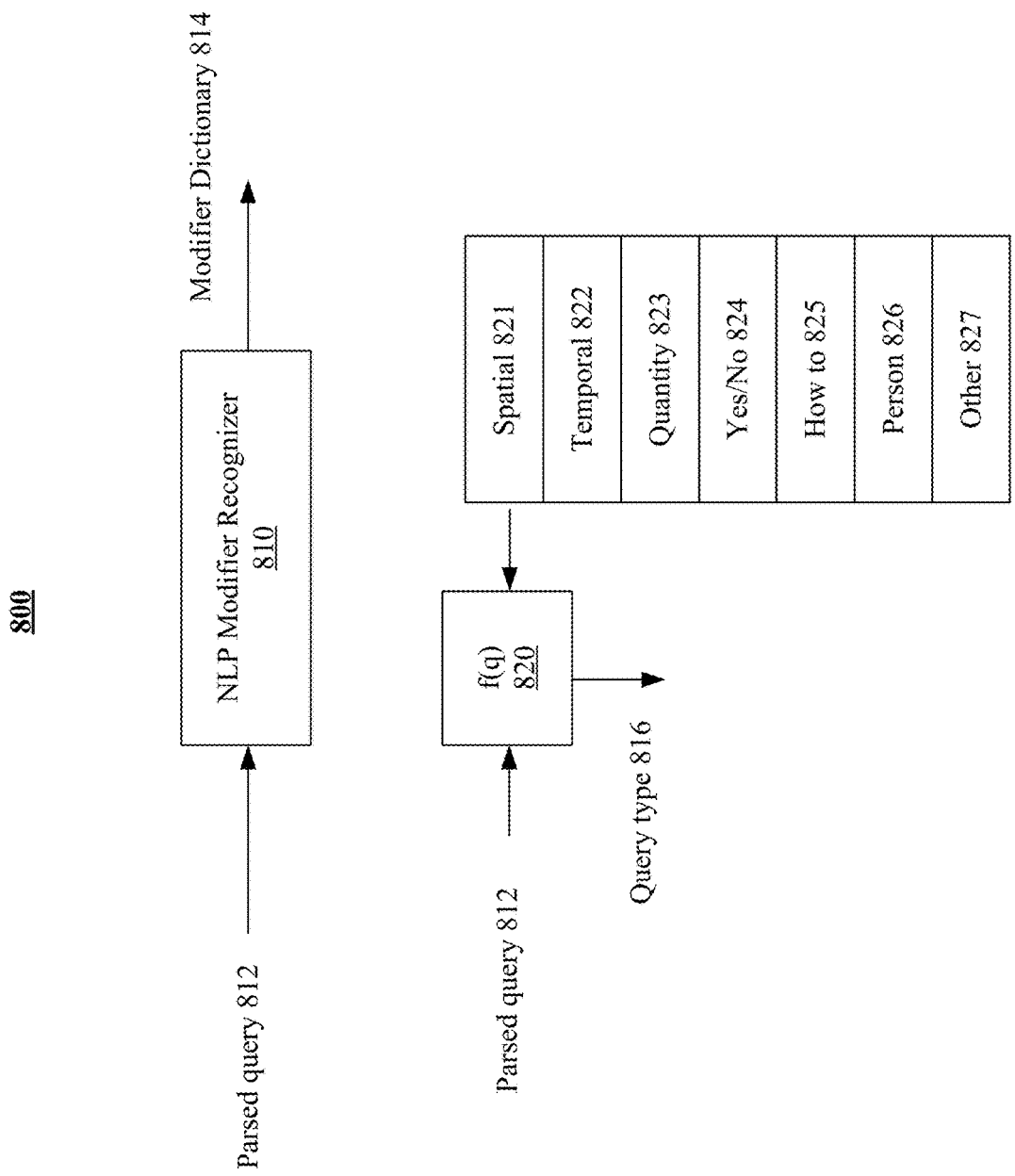
FIG. 8 illustrates a diagram of an example contextualization module for identifying the type of query being analyzed.

FIG. 8 illustrates a diagram 800 of an example contextualization module for identifying the type of query being analyzed. The previous parse module may produce a parsed graphical model of the input query, but it may not necessarily identify the type of query being analyzed. The type information of query may be essential in the search and response modules because the requested exacted sensor data, the analysis of the data, and the conversion into human-readable format may depend on the type information. In this functional block, the system may identify what the user wants to know using the contextualization module (143B in FIG. 7). The contextualization module may include a NLP modifier recognizer 810 and an f-function module 820. The NLP modifier recognizer 810 may identify one or more modifiers from the parsed query 812 which is fed to the NLP modifier recognizer 810. The identified modifiers may be saved in a modifier dictionary 814. The f-function model 820 may analyze the parsed query 812 and identify the query type 816 based at least on a number of pre-identified query types, including, for example, a spatial type 821, a temporal type 822, a quantity type 823, a yes/no type 824, a how-to type 825, a person type 816, and other type 817.

In particular embodiments, the query type may be identified by passing through several layers of heuristics. In particular embodiments, the system may match query type by action modifiers in the query. In particular embodiments, the system may target some general questions types including, for example, but not limited to, "PERSON", "PLACE", "TIME", "QUANTITY", "TIME", "HOW-TO", "RECOMMENDATION", "YES/NO", etc. These types may identify what information modality to look for while accessing semantically relevant sensor clusters. These types may also suggest the appropriate type of response. However, particular embodiments of the system may not seek to be a chat bot and therefore may not make use of pseudo-human natural language responses. Instead, the system may place more emphasis on understanding the query meaning and method of matching the query to the appropriate data store. In particular embodiments, the question types may be identified by question-type pattern recognition using template sentence grammars.

In particular embodiments, the system may match temporal context from a named entity recognition (NER) module. The system may accomplish this by using another pattern-recognition technique. Specifically, the system may use algorithms to search for temporal patterns containing words associated with both cardinal numbers (e.g., "day", "week", "month", "evening", etc.) and temporal modifiers (e.g., "last", "next", "ago", etc.). The relevant temporal window may be formed based on with these patterns. The system may use both a start and stop timestamp, whose form matches the sensor database. These timestamps may be used to narrow a search to relevant instances of sensor cluster activations.

In particular embodiments, the system may form context relationship modifier dictionaries. This step may be performed in a similar manner to the above temporal context section. Assuming the parse module uses a graphical (e.g., projective directed acyclic graph) language model, then the query model may be traversed using a parent-child strategy: (1) the query root may be firstly found; and (2) for all of the children (dependents) of the query root, the system may determine whether they are subject, object, language-complements, or modifiers. With this knowledge, the system may form a bag-of-words representation of the relevant terms which may be used later to form the word-vector for a semantically relevant sensor cluster search.

Figure 9:
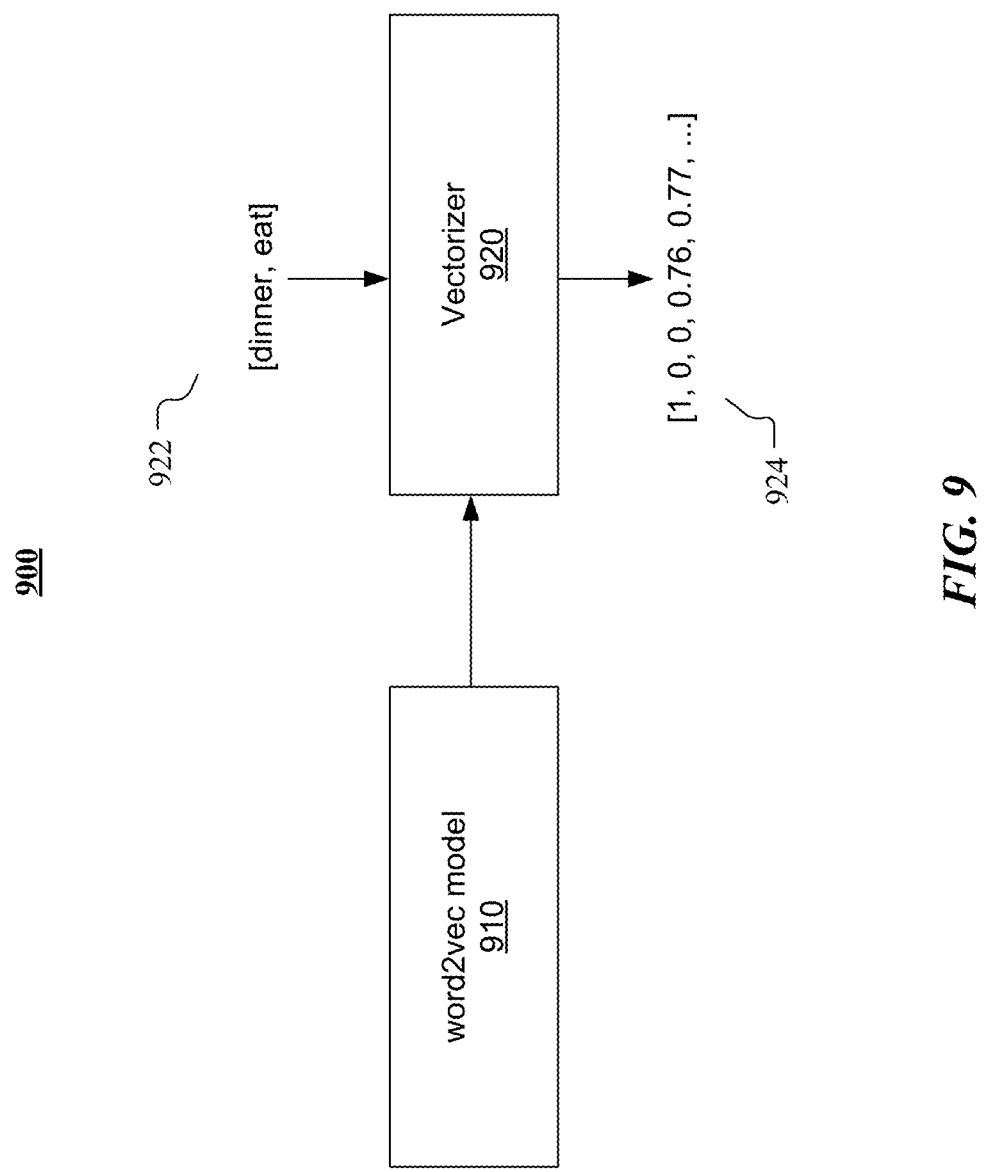
FIG. 9 illustrates a diagram of an example process flow of the vectorization module.

FIG. 9 illustrates a diagram 900 of an example process flow of the vectorization module 920. At this point, the query may have been transformed into a structured language graph with a type. Now the graph may be vectorized by the word2vec model 910 to be compared to other soft-semantic clusters associated with concept nodes. The vectorization module 920 may directly link the natural language with semantic relevancy (e.g., 922) to generate a query vector 924. A query vector q may be an M×1 vector formed by summing two vectors, $q_0$ and $q_1$, corresponding to terms in the query. The first vector $q_0$ contains 1's for every word in the input query tree (Q) that is also an element in the original term-frequency matrix (A). These 1's may be located at the same row as they were in matrix A. The vector can be defined more formally by the following equation:

$$g_0[i]=1 \forall i(i \in Q \cap T) \quad (3)$$

where, i corresponds to the index where the term $t_i$ occurs in T; Q is a query tree structure. The tree structure can either be projective or non-projective. The benefit of a projective tree is that it is not NP-hard to traverse.

FIG. 10 illustrates an example projective tree structure 1000. FIG. 11 illustrates an example non-projective tree structure 1100. The second vector $q_1$ may contain (at most) the top-four squared similarities of words in the system database that are also not in Q. One of the goals of this second portion of the querying may be to "blur" the query slightly. This may allow semantically similar words (elements of Sense+ database dictionary) to contribute to the eventual projection onto fuzzy-cluster subspace. They may be included only if their similarity is greater than cosine equal to 0.5.

$$q_1[i]=(v_1^T v_k)^2 \forall i,k (i \in T, k \in Q, \text{ and } v_1^T v_k > 0.5) \quad (4)$$

where $v_i/v_k$ are the word2vec vector representations of the words corresponding to $t_i$ and $t_k$. The power-2 operating on the cosine similarity may serve to deemphasize a term that is just similar to a term in Q, but not actually in that set. The similarities may be bounded by 0 and 1, so squaring them will reduce their magnitudes. This second vector may be used to populate the otherwise sparse vector with similar terms. For example, coffee is in Q, but tea is not. However, if similarity between these two words is computed using word2vec (e.g., trained on Google news), then $v_i^T v_k$ may equal to 0.70 and $(v_i^T v_k)^2$ may equal to 0.49. Thus, the 0.49 value may appear at the index corresponding to "tea" in T. Then the q may be determined by $q_0+q_1$. The vector may be formed by the following steps: (1) performing term expansion on query components; (2) forming sparse-weighted term vector.

In particular embodiments, given a large network of semantic concept nodes, the system may match the query to these soft clusters in an efficient manner that will lead to a relevancy metric in a later step. The projecting module may reduce query vector dimensionality to match soft clustering vector space dimensionality. Querying may begin with a vector as long as the term is contained in the database. Cosine distance may be used to compute similarity between query and database. More specifically, the query may be vectorized and compared to a database soft clustering using singular-value decomposition (SVD).

In particular embodiments, the initial set of sensor clusters may be drastically limited by performing compression and soft clustering before querying. Specifically, a term-frequency matrix may be stored in memory with columns corresponding to sensor clusters identification numbers and rows corresponding to concepts (semantic terms) frequencies. Both rows and columns may be unique. The matrix may be used to indicate which sensor clusters are most relevant to a query. In particular embodiments, there may be a number of steps to perform prior to directly using the term-frequency matrix. First, each column's term frequencies may be normalized to reduce or prevent common terms from dominating the nodes. For example, a particular coffee shop may have many concepts associated with drink, but it may also be represented when a query relates to wireless charging stations for mobile devices. The de-emphasis process may be performed by dividing each row by the sum of the counts for the entire row. Second, a sensor cluster that contains many terms may not be weighed higher than other sensor clusters. The de-emphasis process may be performed by dividing every column by the sum of term-frequencies in that column. Both of these operations may be written as the following equations:

$$\hat{A} = \left[ A^T \left( \sum_{j=0}^{N} E_j A \bar{1} e_j \right)^{-1} \right]^T \quad (5)$$

$$\tilde{A} = \hat{A} \left( \sum_{j=0}^{M} E_j \hat{A}^T \bar{1} e_j \right)^{-1} \quad (6)$$

Where $\bar{1}$ is an M/N×1 array of ones; $E_j$ is an M×M or N×N matrix with 1 at the position (j, j) and 0 everywhere else; $e_j$ is a 1× M/N array with 1 at (1, j) and 0 everywhere else; and −1 indicates inverse. A singular value decomposition may be performed on $\tilde{A}$ to begin a soft clustering approach. The SVD analysis may result in three separate portions $\tilde{A}=U\Sigma V^T$. U represents the eigenvectors of $\tilde{A}\tilde{A}^T$. If no normalization is performed on the terms (i.e., A=$\tilde{A}$), then $\tilde{A}\tilde{A}^T$ may an M×M matrix where $\tilde{A}\tilde{A}^T$(i, j) is the number of nodes terms i and j both appear in. And $V^T$ may be the node similarity matrix formed from the eigenvectors of $\tilde{A}^T\tilde{A}$. The eigenvalue s for both of these matrices may be equal and inside the diagonal matrix Σ. Since one of the goals of this analysis may be to reduce dimensionality (and thereby reduce computational power requirements), the system may use an optimization function to remove $\sigma^2$ values from Σ. In some embodiments, the optimization may be performed on a set of known-node correlation priors. This method may manifest itself as minimizing node cosine similarities products. In some embodiments, dissimilarities may be more important from an optimization standpoint. For low-dimensional SVD, the terms (and therefore nodes) may be concentrated in a few soft clusters, and therefore the similarities seen in $\tilde{A}^T\tilde{A}$ would be artificially close to 1. If dissimilarities are used as priors, then this problem may be mitigated, and the optimization may tend toward a higher dimension. More specifically, the function used to minimize may be:

$$\phi_r = \prod_{1=a}^{b} \left(1 - \tilde{A}\tilde{A}^T\right)_r (i_1, j_1) \quad (7)$$

where a is an element in set of states (known relations of node dissimilarities) and r is the number of dimensions (eigenvalues). In general, r may be approximately 12 to 16 (for N=18). FIGS. 28 and 29 illustrate two tables including the numerical parameters and results. Table 1, as shown in FIG. 28, on the left side, a similarity table between GPS nodes for R=16. The highlighted cells indicate the priors used for dissimilarity optimization. Table 1 shows, on the right side, a lookup table showing the proper names of the nodes (e.g., semantic names corresponding to $N_i$) appearing in the similarity table. Whereas, the tabulated results from this optimization are shown in Table 2, as shown in FIG. 29.

A query vector q may be represented in this lower-dimensional r-space by a simple transformation $q_r=(\Sigma^{-1}U^T)_r q$. Since the query vector is now in a reduced and blurred form, the query vector can be used to match the original query to the Sense+ database semantic clusters. This project module may match dimension of tf-idf algorithm through projection. The project module may reduce query overfitting with soft clustering and term diffusion and increases scalability of query matching.

The previous modules $(\tilde{A}\tilde{A}^T)_r(n,j) \forall j$ $(j \in \{j_{G_0}, j_{G_1}, \ldots j_{G_N}\})$ may reduce the large sensor node set to a smaller and more query-relevant set. The filter module may reduce the set even further to find the most relevant sensor nodes. To find which node this new query vector $q_r$ is closest to in semantic space, a simple cosine dot product may be performed with respect to all nodes, $G_n \in \{G_0, G_1, \ldots G_N\}$. Then, the nodes may be sorted from high cosine similarity to low cosine similarity, or in order of decreasing relevance. In addition to these nodes, the algorithm may also guarantee returning nodes where specific terms appear. Once the final set of relevant nodes is produced, the node may be passed through a filter for outlier rejection. More specifically, the filter may seek out elements that are most unlike the others. First, median values (m) of node permutation similarities may be computed. For each node $G_n \in \{G_0, G_1, \ldots G_N\}$, $m_n$ may be computed of the set and $j \neq n$. This calculation may be performed for all permutations of the nodes in G. The standard deviation ($\sigma_G$) may be calculated for the permutation similarity medians, and then the nodes with similarity as described in following equation may be rejected:

$$\left|\frac{m_n - m_G}{\sigma_G}\right| > \epsilon_{thresh} \tag{8}$$

In some embodiments, the system may use algorithms to reject all nodes using $\epsilon_{thresh}=1.5$. In particular embodiments, this project module may perform the following sequence of operations to reduce the node-set: (1) computing similarity between unfiltered node set; (2) removing outliers; and (3) filtering any common terms or user-defined terms.

Figure 12:
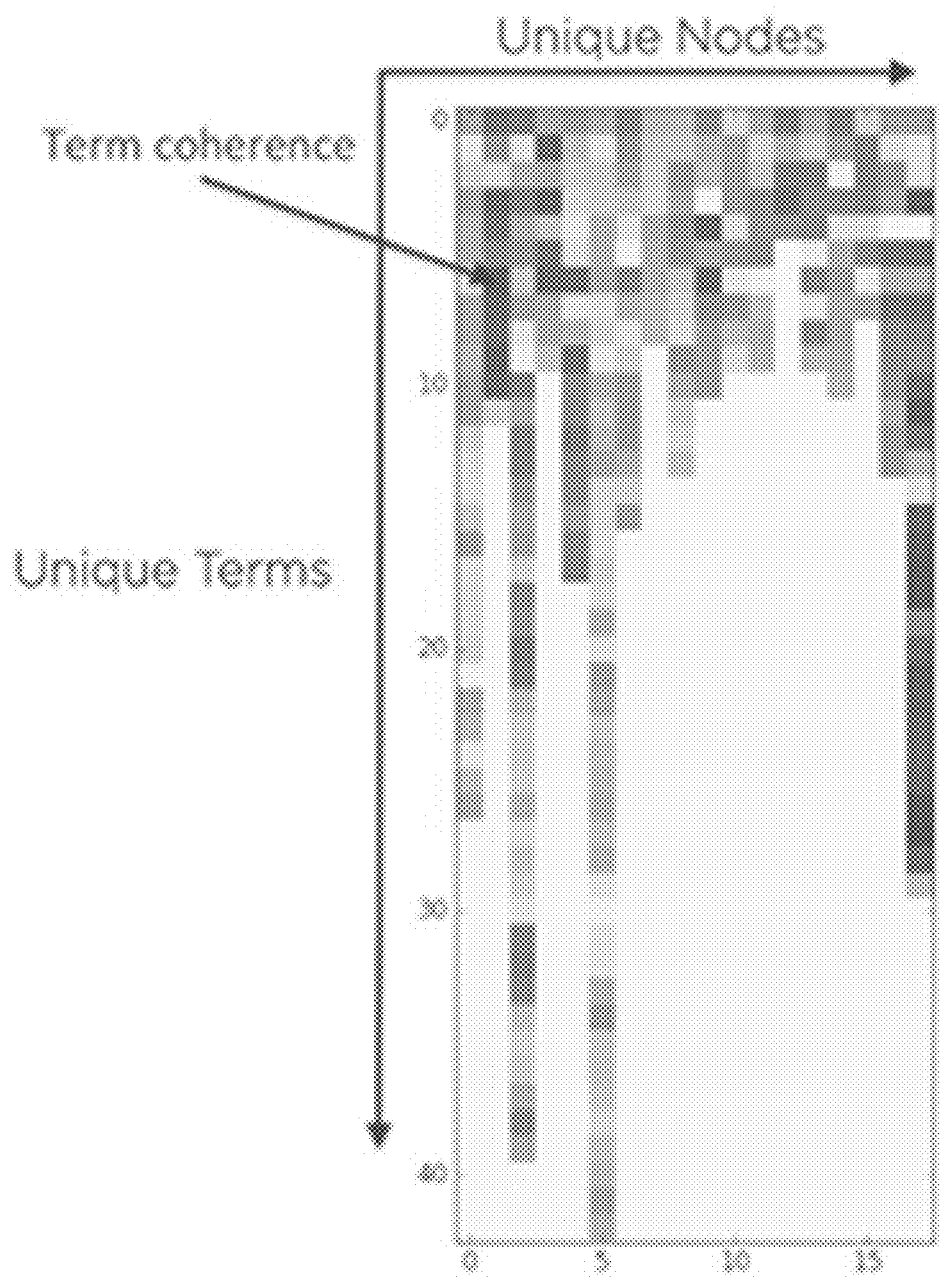
FIG. 12 illustrates an example visual representation of the coherence of each node of dynamic ranking.

FIG. 12 illustrates an example visual representation 1200 of the coherence of each node of dynamic ranking. The previous modules may return a set of well-matched sensor nodes given a query. The ranking module may rank these sensor nodes to ensure the user is accessing most relevant objects to the query. Specifically, this design may break the matching problem into two separate parts. The first part may be static and independent of the query posed. The second part may emphasize connection between semantic content of nodes and the concepts contained in the query.

After the relevant semantic clusters have been identified, the next step may be to determine each cluster's rank. Ranking the resulting nodes is a complex task as it relies on the parsed query content (relevant terms), semantic model, and the type of query being posed. A first type of ranking may be dynamic ranking while another method may be static ranking. As a first step at ranking, a coherence metric may be formed for each term in each node in the semantic space. More specifically, for a given term $T_m \in T_{G_n}$, a similarity computation for this term to all other terms appearing in $T_{G_q}$ may be performed. For this computation, word2vec model may be used and the similarity may be computed using this model. For formalism, $\Gamma(T_m)$ may be the operator which returns the "coherence" $\gamma T_{m^n}$ of a node relative to a term $T_m$. The actual ranking for nodes may be then defined as follows:

$$R_n = \frac{1 - \sum_{j=0}^{K} \gamma T_j n}{1 + \sum_{j=0}^{K} \gamma T_j n} \tag{9}$$

where, K is the number of unique terms used in query vector q and the ranking is bounded between 0 and 1; 0 indicates extreme relevance and 1 indicates no relevance at all.

In this method, nodes with more coherence to the relevant terms in the query vector may be given more weight than nodes containing the same terms but with less coherence. For example, a house (e.g., 38014th Street) may contain terms associated with "food", "exercise", "sleep", etc. This set may constitute a very incoherent cluster as many of these categories are semantically unrelated. Conversely, a cafe (e.g., a coffee shop) may contain terms like "coffee", "tea", "drink", "food", etc. These terms may be much more coherent than the terms for the house as these terms are all more similar to each other. The node ranking may be not necessarily unique, but once each node has a ranking, the nodes may be sorted from low to high and assigned an integer ranking for display purposes. The ranking may be performed as the superposition of two components: (1) dynamic ranking which ranks results based on semantic coherence; (2) static rank whose ranking results are based on node outlinks using modified PageRank algorithms. The dynamic ranking method is described above as the piece of ranking that may change based on the query.

In particular embodiments, although it may be ideal for under-represented (in the semantic sense) sensor clusters to be reachable in a search, it may be also advantageous for these often-visited and high degree (in the sense that the sensor cluster is connected to many other nodes) to be given the ability for a higher weight. By using a modified PageRank algorithm, particular embodiments of the system may add an additional degree-of-freedom to the ranking module. The PageRank algorithm may allow for popular clusters to be given higher weight independently from the dynamic ranking that emphasizes semantic coherence (better matching between query and semantic clusters associated with sensor clusters). Particular embodiments of the system provide technical advantages over previously technologies by de-emphasizing nodes associated with overloaded semantic representation (many concept node outlinks) and emphasizing frequently-visited sensor nodes.

Figure 13:
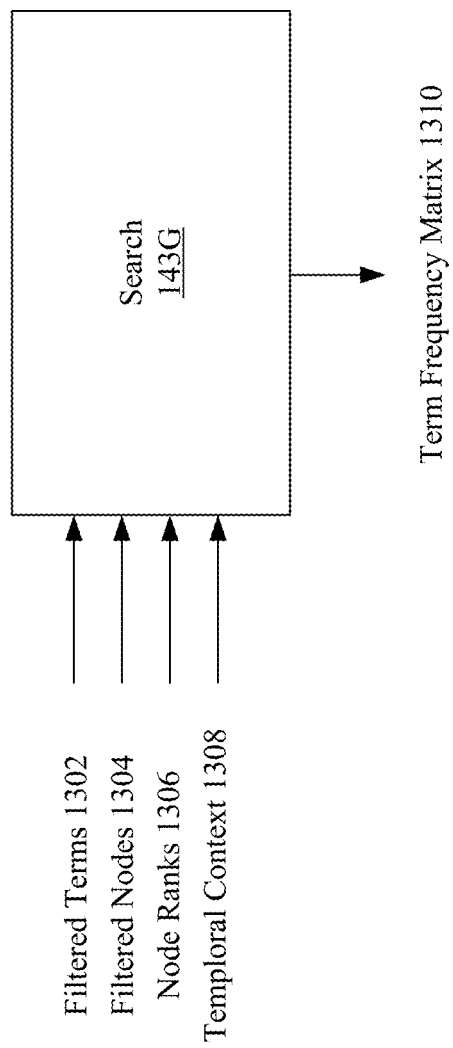
FIG. 13 illustrates an example search module for performing sensor cluster search with search parameters.

FIG. 13 illustrates a diagram 1300 of an example search module 143G for performing sensor cluster search with search parameters. The search module 143G may be fed with parameters including, for example, filtered terms 1302, filtered nodes 1304, node ranks 1306, temporal context 1308, etc., and generate the term frequency matrix 1310 as outputs. This stage of the query processing may perform the lower-level search in a sensor node to retrieve the information being requested. The previous modules may provide relevant sensor nodes, semantic sensor tags, temporal context, and rankings associated with each of the sensor nodes. With this information and the knowledge of the type of query, an actual sensor cluster search may be performed. This step may use a recursive algorithm to search sensor node database. Specifically, the system may use the following pieces of information to retrieve information about multimodal sensor clusters: (1) object type (e.g., node information); (2) time-target (e.g., a start and stop timestamp described in an earlier module); (3) object UIDs (associated with the remaining sensor clusters after projecting, filtering, and ranking in the preceding modules); (4) object ranks (e.g., ranks associated with sensor clusters described in ranking module); and (5) response relevant terms (e.g., terms that will be used to construct a response in a later response module).

Figure 14:
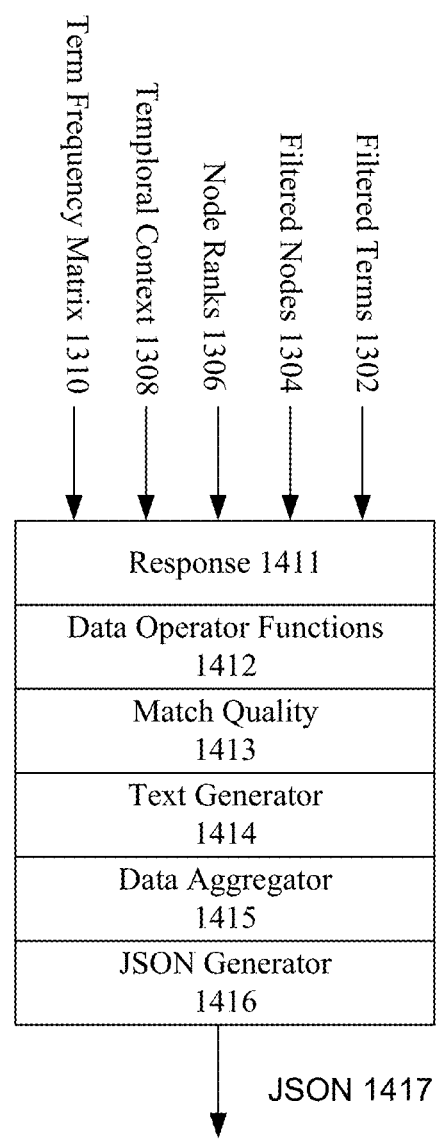
FIG. 14 illustrates an example response module for generating a response to one or more natural-language queries.

FIG. 14 illustrates a diagram 1400 of an example response module 1411 for generating a response to a query(ies) in the form of natural language. The response module 1411 may include or be associated with multiple modules including, for example, data operator functions 1412, a match quality module 1413, a text generator 1414, a data aggregator 1415, a JSON generator 1416, etc. The previous modules may query a graphical database given a text input. This response module may construct a response in the form of text displayed to user. There are many ways this output can be accessed by the user. One example that may be used by the system is a JSON. The search module inputs (e.g., filtered terms 1302, filtered nodes 1304, node ranks 1306, temporal context 1308) or/and outputs (e.g., term frequency matrix 1310) may be fed into this response module 1411 where the query is answered and converted to a response JSON 1417 structure for sending via web server. This response module 1411 may also determine the quality of the match. The graphical flow, as shown in FIG. 14, may directly follow the previous section as it contains the newly formed term-frequency matrix reduction based on the dynamic aspect of the querying. The response may be generated using two operations on the search results from the search module: (1) matching query context to function operators and then performing associated operations; (2) ranking and qualifying match quality as "exact" or "match".

Figure 15:
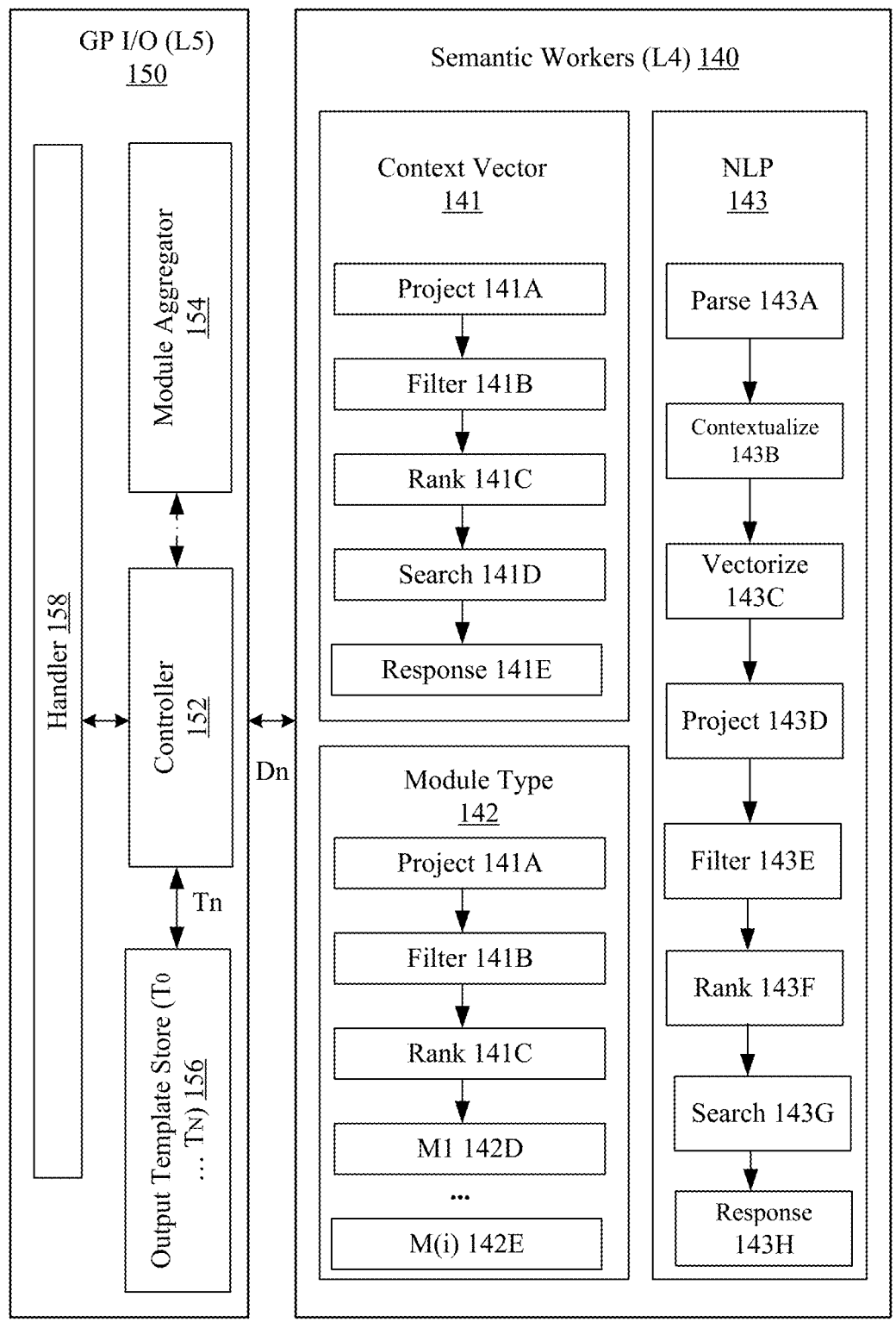
FIG. 15 illustrates example modules of the querying or general purpose I/O layer.

FIG. 15 illustrates a diagram 1500 showing example modules corresponding to the querying or general-purpose input/output (GP I/O) layer (L5) 150. The GP I/O layer (L5) 150 may be referred as the querying layer across the previous sematic workers layer (L4). The querying layer may be the closest layer to the user interface and inherently begin to response when the user (e.g., human or computer) asks a question to the system. This querying layer may unify the sensor data and provide a common language to access the insights gained by the system. The querying layer may bridge the gap between the user interface and the access to the system's intelligent algorithms. As described in previous sections, the system may be aware of the environment, the user's choices, and what the mobile device can provide. The system may do this by extracting low-level sensor data, fusing them, and constructing a common context abstraction layer (CAL) as described in previous sections. Using the system platform and the information served by CAL, the system can provide the framework to support an adaptive user experience using the modules contained within this querying layer. For example, a developer can invoke semantic workers contained in the semantic workers layer via the controller module 152. The controller module 152 may give each semantic worker a task and a structured data-object ($D_n$) (a data object matching one of the templates ($T_n$) in the output template data store 156). Then, the semantic worker may assemble modules, execute the assembled modules, and write results to the data object. Once this process is finished, the system may send the corresponding data object to the UI and notify the UI to react.

The handler 158 may act as the bridge between the lower-level layers (L1 to L4) and the UI (L6). The handler 158 module may be directly connected to both the UI and the controller 152. Once the user has interacted with the UI, the type of query may be identified according to the information that the UI is requesting. Subsequently, the data object $D_n$ may be created and populated with the arguments corresponding to the query, which may include a string indicating the result of the identified query type itself. Finally, the data object $D_n$ may be sent back to the UI as the output result for the request placed by the UI.

After the user initiates an action, the UI query type may be identified and a structured data object ($D_n$) is constructed. This type of UI action may include, for example, but are not limited to, tapping the microphone icon or voicing a question. This type of UI interaction may signal some actions including, for example, notifying the handler 158 to expect natural language (NLP), notifying the handler 158 to deliver natural language (NLP), or including the query. Notifying the handler 158 to expect natural language may be handled by setting the QUERY_TYPE to NLP. Notifying the handler 158 to deliver natural language may be accomplished by setting the QUERY_MODULE to "response" mode, whereas including the query may performed by including the requested query string text itself. The setting may be described as following:

$$D_n = \{\\
\text{'QUERY\_TYPE': 'nlp',}\\
\text{'QUERY\_MODULE': 'response',}\\
\text{'QUERY\_FIELD': query}\\
\}$$
query = "Where do I like to eat dinner?"

The handler 158 may notify the controller that there is a new query and deliver it. The controller may be initialized for first time and may be notified to perform a task. While initializing, the controller may create independent threads on which the semantic workers can operate. In some embodiments, this step may be limited to the number of CPU cores available in the mobile device. Once the controller is initialized, the controller may notify the module aggregator 154 to dynamically instantiate the necessary abstract modules required to process $D_n$. As a result, the module aggregator 154 may provide to the controller 152 an ordered list of initialized modules instantiations. The controller may pass an appropriate output data object $D_n$ (chosen from one of the available data templates $T_n$) to the semantic workers and may force their executions. The semantic workers execution may be performed using the independent threads discussed previously of this process. Each semantic worker may have direct access to the graph database (L3) and the CAL layer (L2) which are associated with a directed acyclic graph (DAG) that links the semantics, the clusters, and the extracted sensor data.

Once all the semantic workers finish executing their tasks, the structured data object $D_n$ (now completely populated) may be passed back as the "output result" to the UI layer (L6). An example of a constructed response may be: "You like to eat dinner at Rose & Crown in Palo Alto." In summary, this query process flow may indicate the path traversed throughout the DAG, the actions executed based on the user interaction(s) with the system, and the type of information requested during such interaction(s). The examples above is not limiting examples, but merely serve to illustrate the basic functionality of the querying mechanism. Lastly, the actual response type and querying processing can be defined by the system developers and contributors. New system responses and behaviors can be implemented within the semantic workers layer (L4) since the workers can be autonomous and can be programmed to execute other types of tasks using the system resources provided within the entire system.

Figure 16:
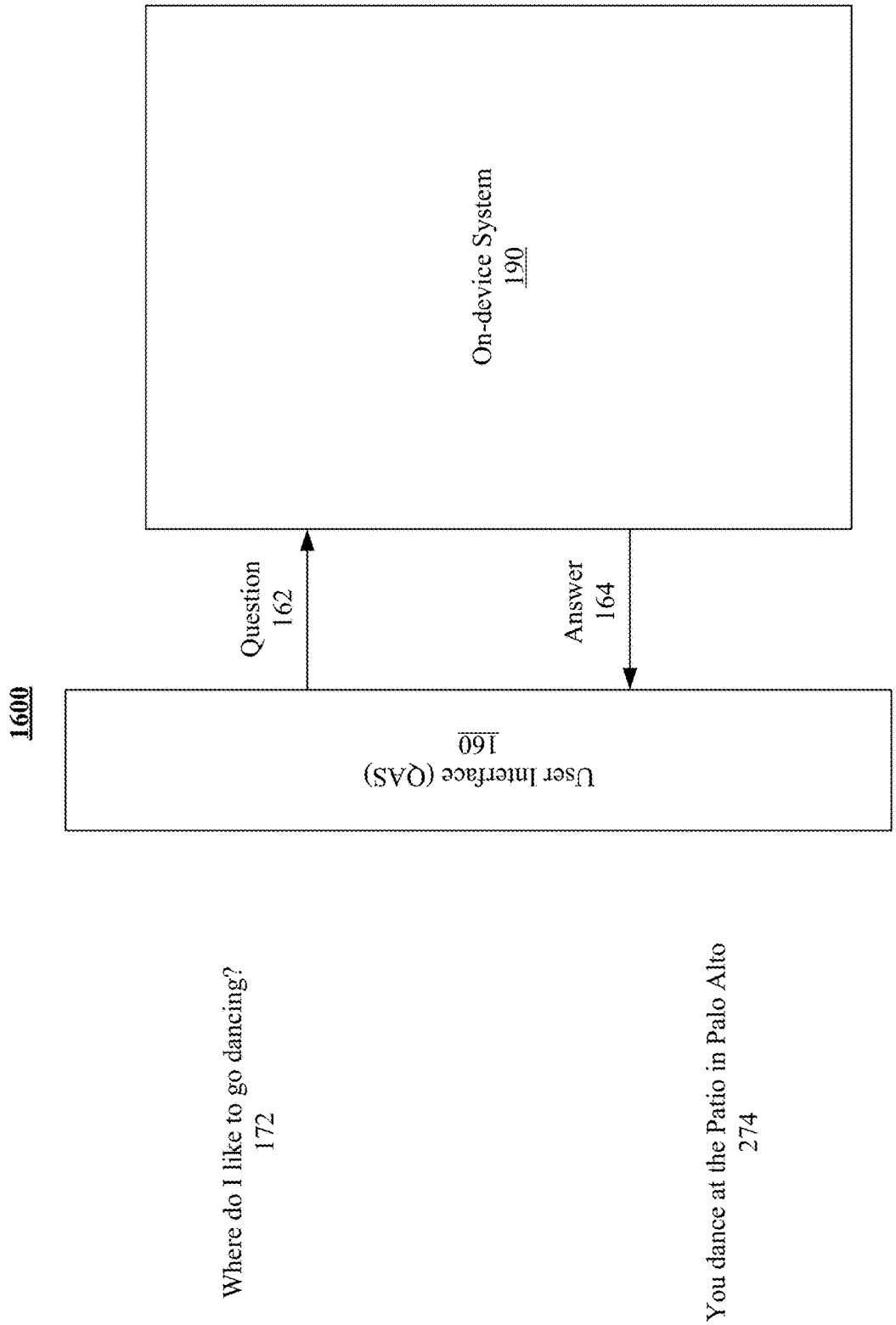
FIG. 16 illustrates an example query process.

FIG. 16 illustrate a diagram 1600 of an example query process. While the underlying system presented herein may have many interesting applications, the question answer system (QA) interface 160 may showcase the system's ability to summarize the large amounts of data captured by the user's mobile phone, help users to remember things that they might forget, and collect behavioral and usage patterns in a way that matters for the users. The QAS interface may allow users to explore their own lives and memories through both graphic user interface (GUI) and voice user interface (VUI). A user may ask a question (e.g., 172) in natural language through the QAS interface 160. The question information 162 may be transmitted to the system 190 for analysis and the answer information 164 may be sent back to the QAS interface 160. The QAS interface may present the response answer 274 to the user in natural language (e.g., 274).

Figure 17:
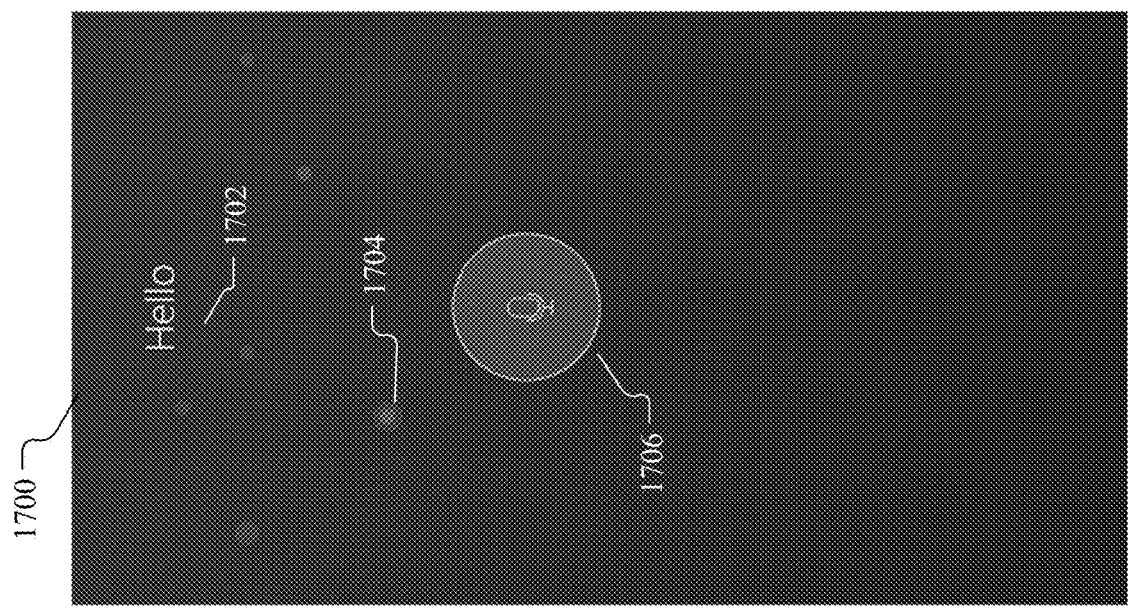
FIG. 17 illustrates an example user interface of the system.

FIG. 17 illustrates an example initial user interface 1700 of the system. The user interface 1700 may include a greeting sentence 1702 from the intelligent system, an actionable voice-question button 1706, and graphical icons (e.g., in the form of small stars 1704 or other displayable elements) for users to get a glimpse of their daily lives. The simplicity of the UI interface allows users to quickly access the most relevant places/areas, relating them rapidly to their real-time situations. The UI 1700 may rely on the system's understanding of each user's behavioral patterns, routines, and frequently visited or important locations. Even though the simplicity is embedded in the UI 1700, it may abstract in an interactive manner the richness of information embedded within the system by dynamically showing relevant information requested by the user in real-time.

Figure 18B:
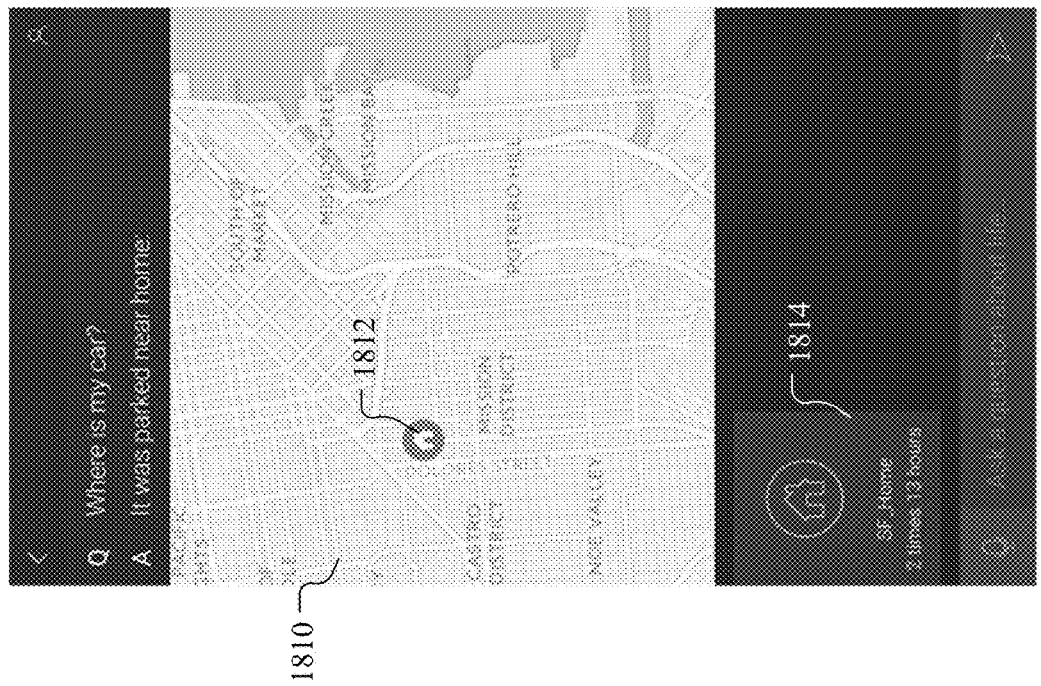
FIGS. 18A-B illustrate example user interfaces for responding to questions involving place.
Figure 18A:
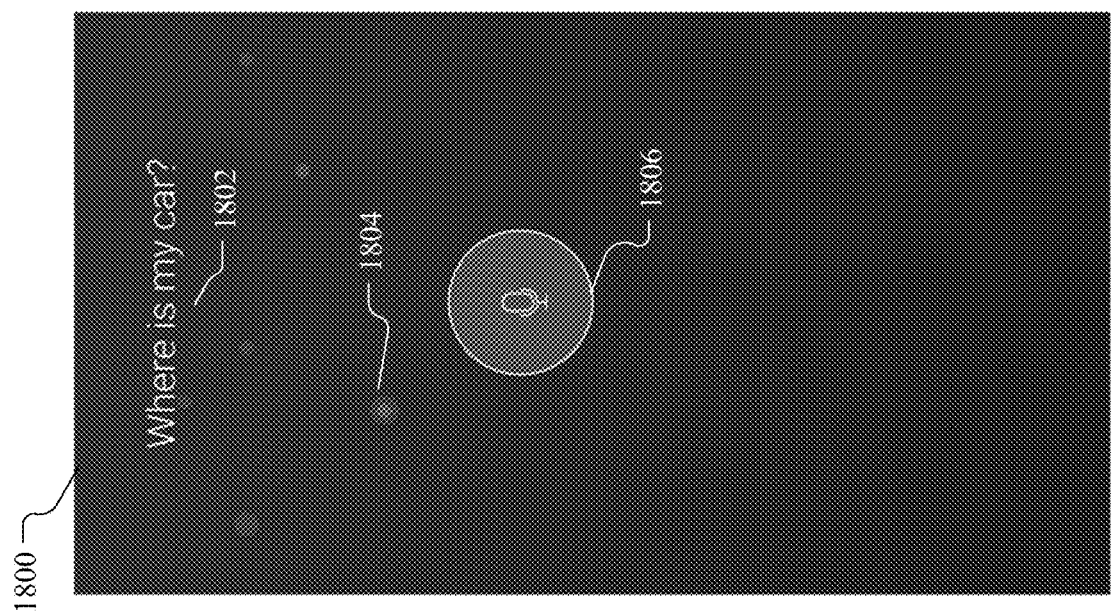

FIGS. 18A-B illustrate example user interfaces 1800 for response to place type of questions. The system may use different types of interactive UI elements that react as answers to the questions posed by the user. The interactive UI element type may be selected based on the type of query indicated by the processor module of the system. For example, when a question contains words relating to location, the UI may change or adjust to display places, as illustrated in FIGS. 18A-B. Specifically, the answer may be presented using colored icons (e.g., 1812) representing the location types on a customized user map 1810. Additionally, in some cases, a brief summary (e.g., information card 1814) of time and frequency spent within each location may be shown in the lower section of the screen. Subsequently, when the user taps on one of the map colored icons or one of the information cards, additional and/or richer information (coming from a finer granularity level of sensing) and relevant to the current question can be accessed. In contrast, when a question is identified by the system to be related to frequency or time, the interactive UI may answer with quantitative natural language and show a list view that includes the user's detail activities related to the question.

Figures 19A, 19B:
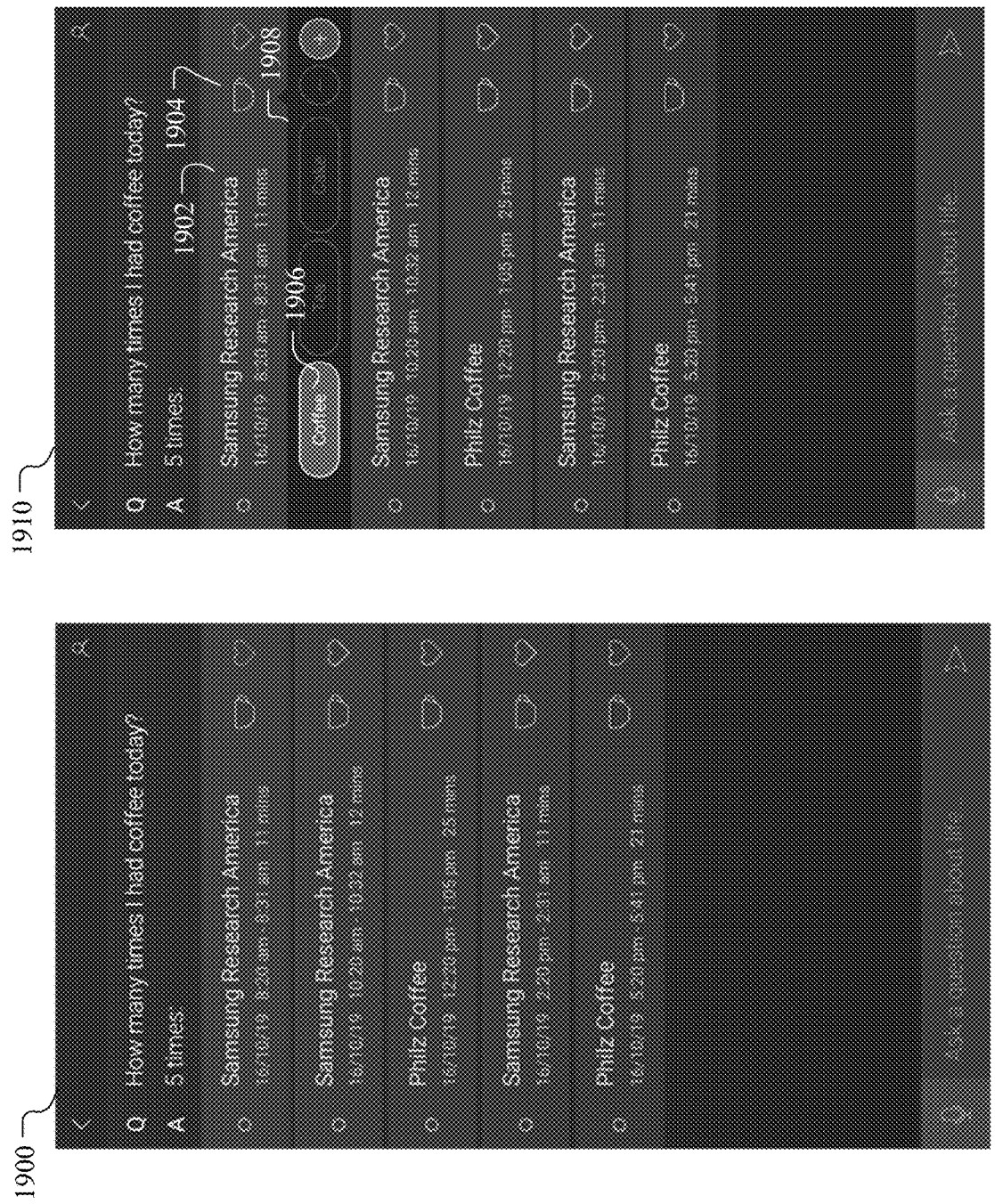
FIGS. 19A-B illustrate example user interfaces for responding to questions involving time or frequency.

FIGS. 19A-B illustrate example user interfaces (1900, 1910) for response to time or frequency type of questions. The user interfaces 1900 and 1910 may each include a list of user-activity items 1908 composed of texts 1902, actionable type-icon 1904, buttons 1906, ant etc. Based on the interactions described above, particular embodiments of the system may use other ways enabling users to explore aspects of their daily lives and get meaningful answers about these aspects. For example, for each item of the list view (e.g., 1900, 1910), an actionable type-icon 1904 may be included (e.g., coffee is represented by coffee type icon). The selection and order of these actionable type-icons may be presented according to the ranks for their related "terms". As another example, various actionable-icons may allow users to share details pertaining to their activities, allow users to annotate the activities with relevant information (e.g., which type of drink they have in the selected café, how many cups do they drink, what is the frequency they drink), and allow users to modify and augment their data in a way that it is meaningful to them. In particular embodiments, the system may enable users to be more involved in their own data and to expand the knowledge captured by the system.

In particular embodiments, the QAS interface may also provide useful recommendations based on augmenting the question being asked by the user with his/her real-time situation. For example, if the user is to ask previously existing intelligent assistants for a recommendation, the answer is likely to be the same or very similar to the answer provided to other users regardless of whether the question involves a highly personal preference. In contrast, particular embodiments of the system may construct the user's answer taking into account the user's location, activity, and/or other information coming from the user's phone and its built-in sensors.

Figure 20B:
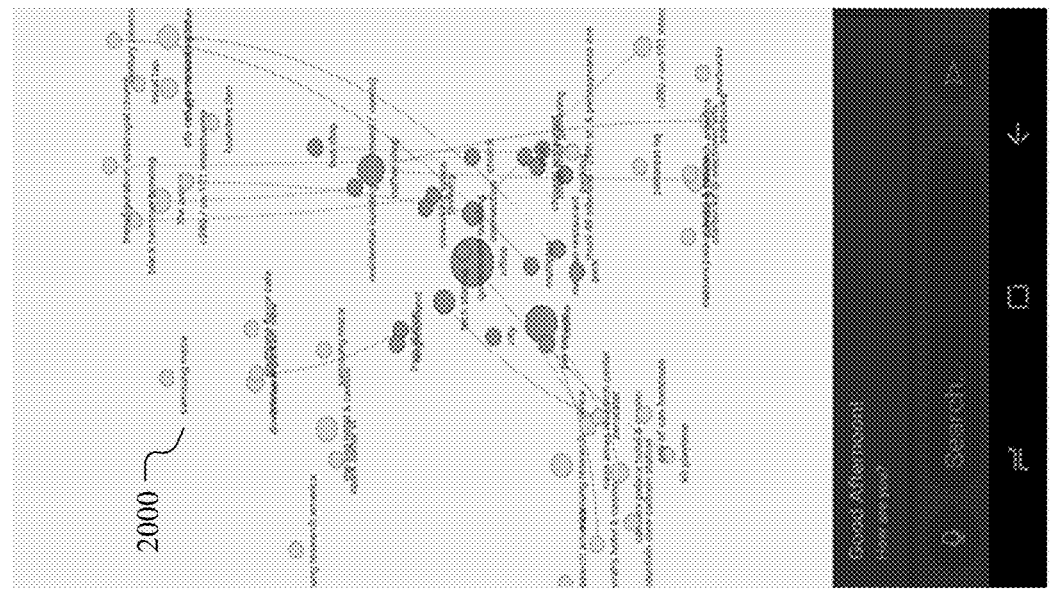
FIGS. 20A-B illustrate an example user interface of the system for data visualization.
Figure 20A:
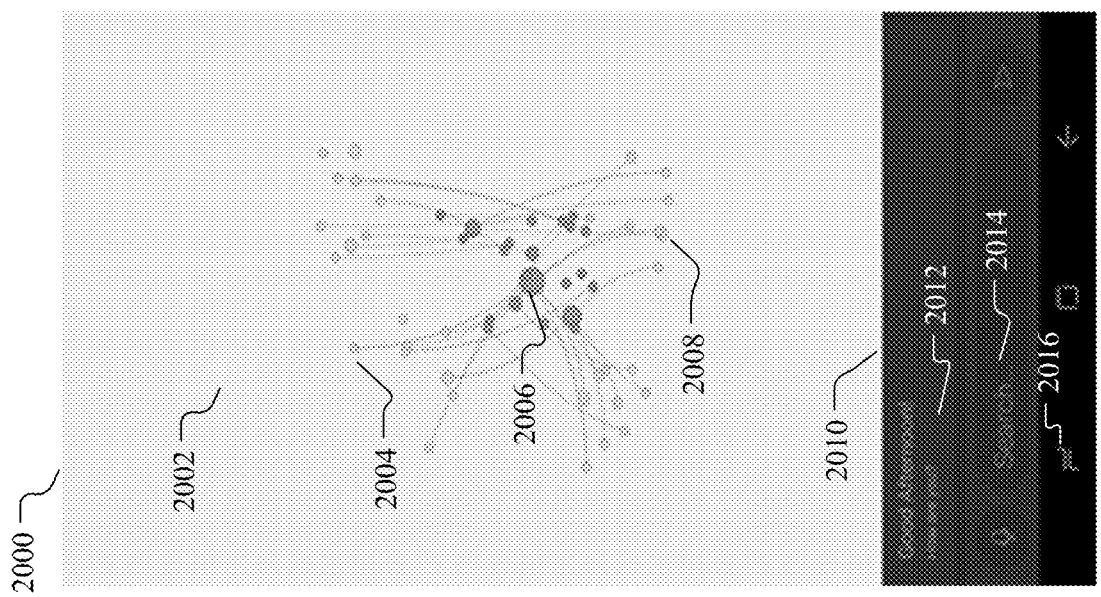

FIGS. 20A-B illustrate an example user interface 2000 of the system for data visualization. The system data visualization UI 2000 may be implemented as an on-device, private, and informative light-weight way to visualize the user's data. The UI 2000 may access the local graph database based on the sematic representation of the user sensed data in an offline manner (i.e., running exclusively on the user's mobile device). The UI 2000 may quickly abstract and display what data is meaningful within the massive data repository generated by phone sensors. The UI 2000 may display relationships between sensor data clusters computed by the underlying system without slowing down the mobile device performance or the low-level system processes and algorithms.

In particular embodiments, for example, the UI 2000 may present information by placing the generated concept nodes as circles (e.g., 2006) in the foreground, the generated sensor nodes (e.g., location nodes 2008) as circles in the background around their relevant concept, and the current location node (e.g., 2004) as a circle in the foreground highlighted by a different color (e.g., pink, blue purple). The size of the concept nodes may be determined by how many sensor nodes are connected to it (which reflects the degree of the node). Therefore, nodes representing frequently visited places may appear to be bigger. The nodes (e.g., concept nodes, sensor nodes) may be connected by into a data visualization graph, as illustrated in FIGS. 20A-B.

Furthermore, when the user taps on a "concept node", its relevant sensor nodes associated with it may be highlighted. For instance, if the concept node represents a place, its highlighted relevant sensor nodes may be Bluetooth, GPS location, or any other sensor clusters produced by the system lower level sensing layers. The interface 2000 may also allow for a new node (either "concept" or "sensor" type) to be created and plotted in real-time or near real-time (e.g., within an allowable time deviation).

Figures 21A, 21B:
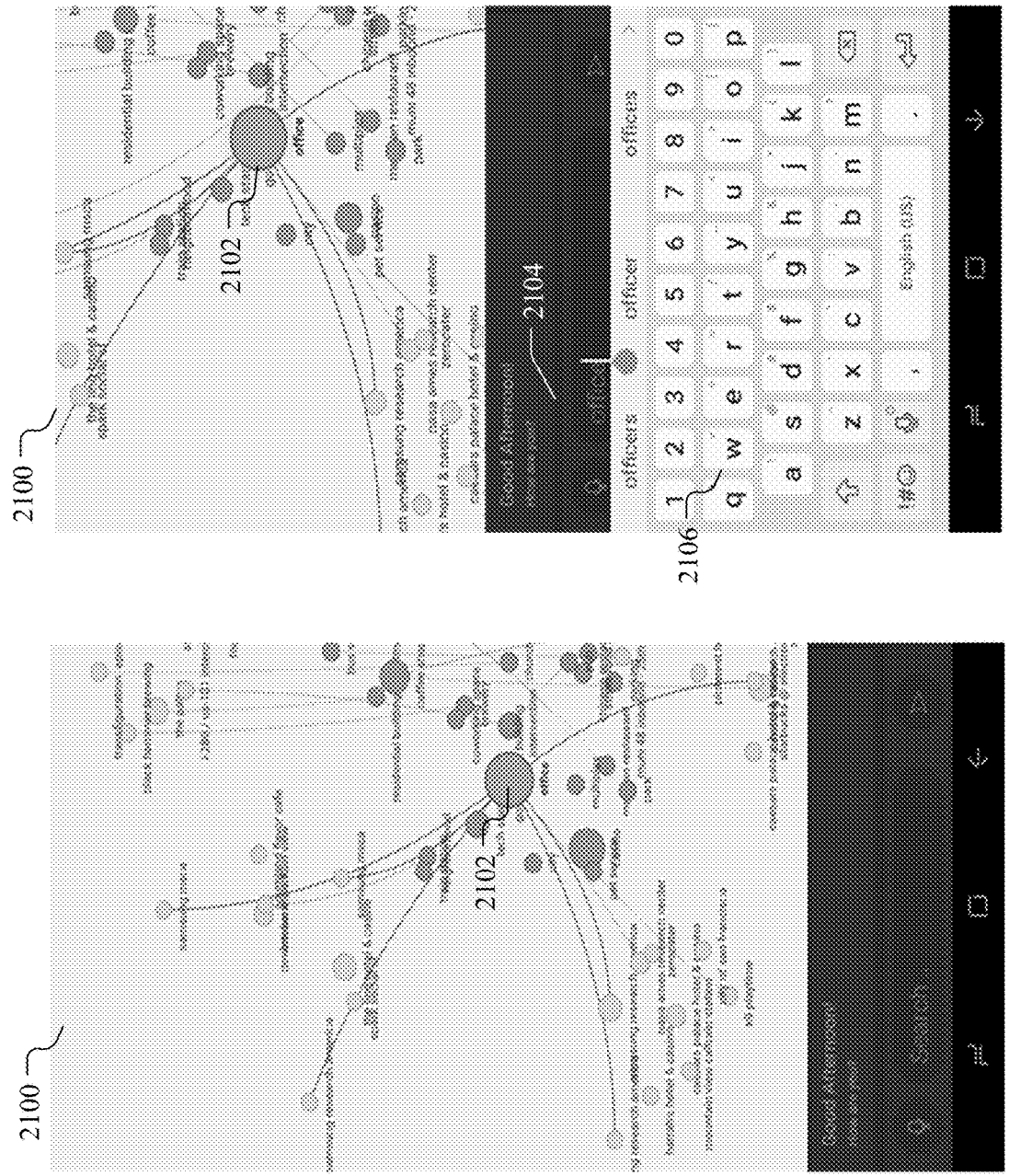
FIGS. 21A-B illustrate an example user interface for users to interact with the system via connected graph visualization.

FIGS. 21A-B illustrate an example user interface 2100 for users to interact with the system via connected graph visualization. In particular embodiments, the system may use an application UI 2100 to allow the user to quickly enter a question via text and receive an answer on the graph UI by using a method similar to the question answering system described in the earlier sections. Given that the graph UI interface can access lower-level sensor layers via the system processor module, when the user taps on a concept node (e.g., 2102), the system may allow a user to get access to a finer-level of sensor information. This functionality can be possible because, as described in earlier sections, the semantic representations encountered by the system can be connected to the automatically generated sensor clusters via the graph, which contains user-accessible attributes related to the sensors and data. For example, when the user taps on a node (e.g., 2102) representing an abstract semantic concept, the user can get access to the information that indicates which places are related with that concept on the map or, if unique, where that concept is located on the map. After a user taps on the node (e.g., 2102), the UI 2100 may display to the user a search bar 2104 and a virtual keyboard 2106 allowing the user to type in information for search nodes and connections in the graph.

Figure 22B:
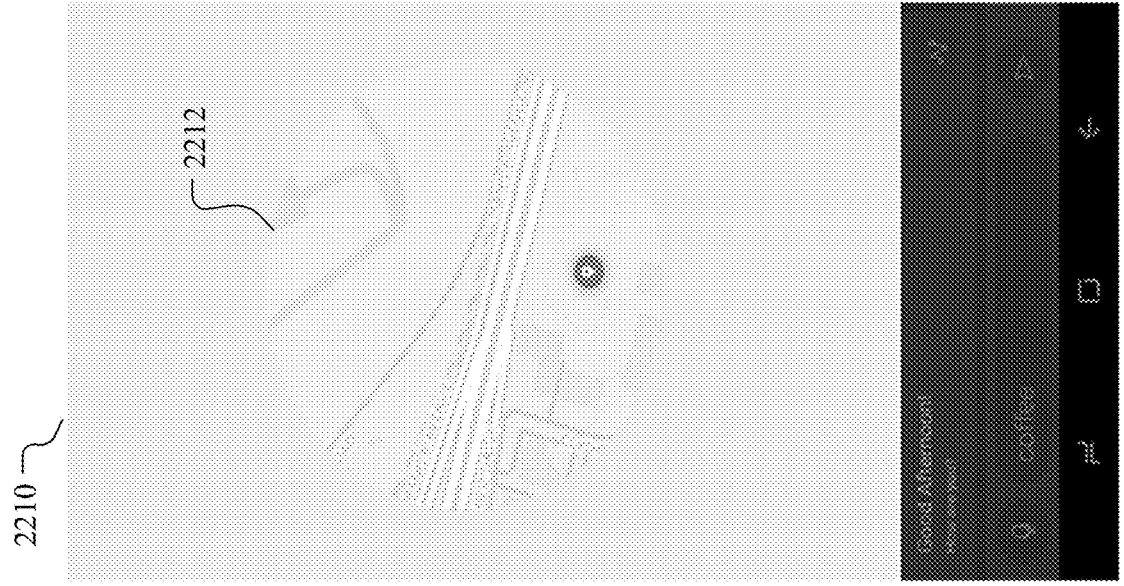
FIGS. 22A-B illustrate other example user interfaces for users to interact with the system via connected graph visualization.
Figure 22A:
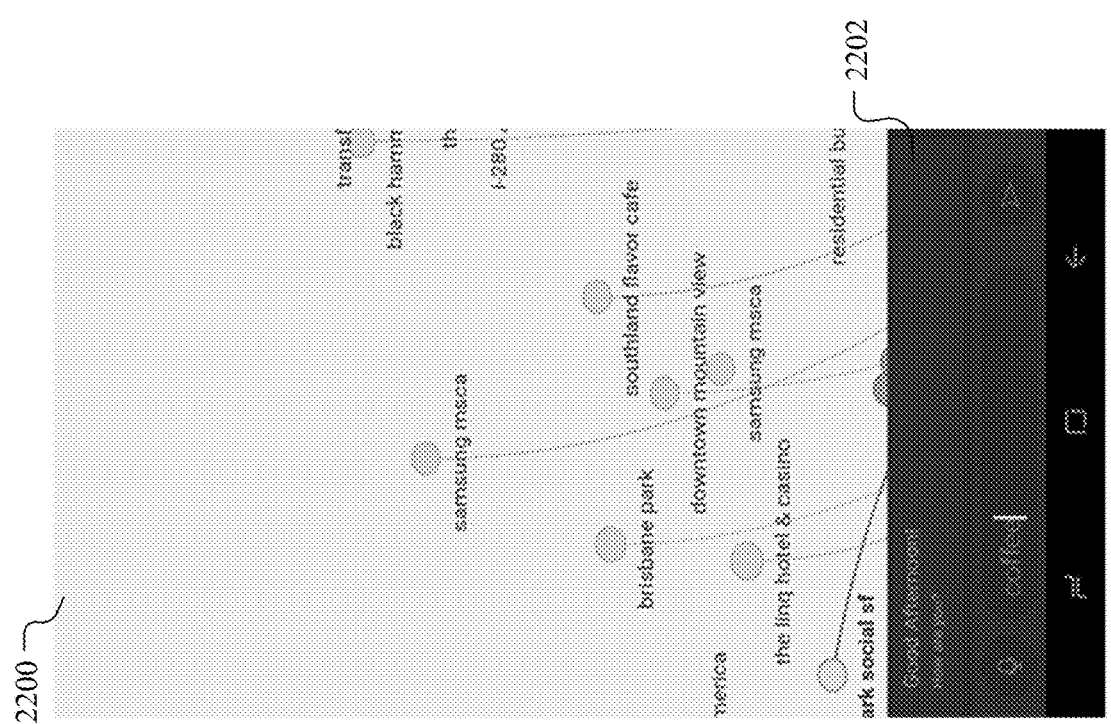

FIGS. 22A-B illustrate other example user interfaces (2200, 2210) for users to interact with the system via connected graph visualization. The user interfaces 2200 may allow a user to tap on a goggle button 2202 to switch to another user interface 2210 which shows a map view 2212 including the current location of the user (e.g., as indicated by mobile device sensor) or other nodes (e.g., concept nodes, location nodes) in the map view 2212.

Figure 23C:
FIGS. 23A-C illustrate example user interfaces for using the system on Edge.
Figure 23B:
Figure 23A:

FIGS. 23A-C illustrate example user interfaces (2300A, 2300B, 2300C) for applying the system on Edge. With the integration of more types of sensors into the system, particular embodiments of the system may have many possible extended features and applications. As an example and not by way of limitation, Edge is a useful, intuitive, and under-utilized feature yet. The general goal of Edge may be to provide quick access to specific applications. Unfortunately, there is limited screen space available for the Edge interface and, as a result, its extensibility suffers because of this limitation. Particular embodiments of the system described herein may be specially positioned to help to alleviate the Edge interface problem since it is designed to support simplicity and rich interactions. This may be accomplished via a minimalistic UI that is expanded on a large set of interactions by the system semantic search engine which can query not only sensor data information via natural language but also can infer what can be the most relevant information for the user at any point in time.

Therefore, the Edge can use the system to map the mobile phone applications to the user's current status. For example, a simple application output can be an interface that presents items, for example, but not limited to, a summary (e.g., 2302A, 2302B) of how much coffee the user had in a day so far and location where the user had the coffee, a list of nearby gas stations (e.g., 2304) upon sensing an eminent low-gas situation in the car, information (e.g., a traffic status 2308A, a traffic map 2308B) not only based on travel navigation guidance (traffic) but also useful information to deliver important reminders upon detecting that the user is going home, pending activities (e.g., dinner ideas 2306) or errands related to home, important stops that need to be made before arriving at the user's destination, etc.

Figure 24:
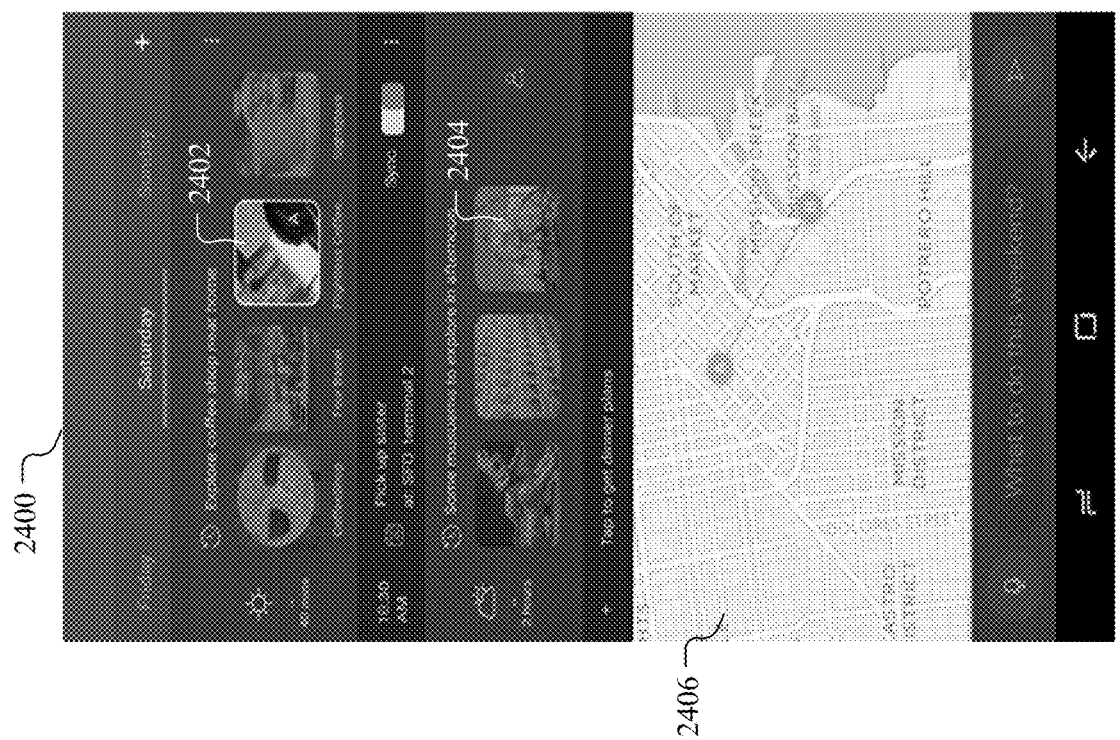
FIG. 24 illustrates an example user interface for multi-events planning.

FIG. 24 illustrates an example user interface 2400 for multi-events planning. While the previously existing calendar-like applications keep users aware of the user-planned events, they lack the ability to keep-up with unplanned changes in the user's fast moving busy life style. In addition, it is not always easy to organize potential plans in advance, especially if there is not only one event to plan, but a series of interdependent events or actions. Particular embodiments of the system solve these problems by keeping track of the user's daily actions (e.g., visiting coffee shop 2402), activities (e.g., visiting museums 2404), and other meaningful events (e.g., events marked on a map 2406) in a private manner. This information, as well as the simple statistics derived from it, can provide guidance to the user for planning events or activities at the best possible times and/or scheduling a sequence of events. As an example and not by way of limitation, the scheduled events can not only be triggered by time but also upon completion of other related events. The user's plan or sequence of planned events can be augmented by suggesting things to explore or do around each event if the user requests it. The user could request to initialize a personalized plan based on his/her own daily behavioral patterns. As another example, the system may allow the user to ask the planner application to suggest a plan for the upcoming weekend. The planner application, powered by the system's semantic understanding of the user's daily behavioral patterns, can assist the user by: (1) taking into account existing items by aggregating them from the user's calendar over the requested period of time; (2) planning a sequence of events augmenting the initial aggregated list obtained from the calendar with other events obtained from the user's patterns of behavior (e.g., events observed frequently or activities or sports that the user likes to do); (3) augmenting the plan while accounting for other real-time contextual factors such as weather, the matching degree of user's interests with the activities offered in the area(s) of interest, venue availability, and the presence of friends in the social network.

Previously existing general search applications provide users convenience when exploring new places or looking up which ones are popular within a particular city or neighborhood. Such applications enable, for example, popularity searches by crowd sourcing, via their users, the rating mechanism of places and businesses. While the rating mechanism on these sites offer a valid approach to judging places, there is no guarantee that a recommended place based on crowdsourced ratings will be the best choice for the user given his/her personal preferences. As a result, most users of these services spend a significant amount of time reading reviews and comparing them between places.

Particular embodiments of the system may discover places in a more intelligent manner by filtering, via a personalized user profile built by the system, the retrieved general reviews coming from different sources. Thus, the discovered places can be filtered not only by GPS and general ratings, but also based on observed patterns of user behavior gathered via the built-in mobile sensors (and/or other sensors). For example, the personalized filter can be built based on aggregating information of, for example, but not limited to, (1) what type of food or drink does the user usually like? (2) does the user like dark or bright environments? (3) does the user like quiet or loud places? (4) does the user prefer solo or group activities? By building an extended filter with these personalized variables, the system can narrow down the discovered places to the best personalized choices for the user.

An alternative use-case for discovering application is traveling. The fact that the system may not need labeled data or pre-trained datasets makes it uniquely valuable when dealing with uncertain situations or environments (e.g., situations during traveling). Thus, the system can quickly adapt to a new context while taking into account the user's preferences. For example, the user can use the system for finding a friend or friends during traveling and get helpful suggestions about a visited area(s) that the user might not be familiar with.

IFTTT may stand for "if this, then that" and it is a service to create chains of simple conditional statements, and to bring the user's favorite services together. While these IFTTT recipes provide helpful automation services to the user's daily life, they have limited ability to adjust themselves in a flexible manner and their associated numerous variables in real-time. This problem may cause the triggering of events that the user was not intending to activate. In addition, in order to create an IFTTT recipe, the user is required to think about the connection between frequently linked activities in his/her daily routine, which he/she might not be very aware of due to the fact that small events or activities within daily routines tend to be invisible or unnoticed to most people. Another problem is that lots of concurrent events and activities are performed together without the user's awareness. These issues create serious problems for IFTT caused by the user's naturally, highly noisy awareness of the environment.

Particular embodiments of the system solve this problem by automatically detecting the services that the user frequently accesses and by sequencing them in the time domain. Once the events are sequenced, their associated places, events, and activities can be linked automatic ally to them. The system may do these using an "IfMe" application. From there, when the "IfMe" application is activated the system may be set to solve the IFTTT problem(s) based on the detected sequence. This can be done by transforming the detected sequence to the template modifiers required by the IFTTT systems. For example, the detected sequences can be used to complete the required IFTTT modifiers: If sometimes ( ), then how about ( )?

Furthermore, before linking any discovered sequence(s) to a service, the "IfMe" application can filter events within the sequence(s) according to predefined user permissions or learned user preferences. Therefore, by means of this filtering mechanism, the system can offer a high level of privacy and personalization to the user. In fact, the objective of the system when supporting the "IfMe" application is not to make it absolute, but rather to support user customization and privacy as much as possible without making the user deal with details that he/she might not even remember.

As an example and not by way of limitation, if the user likes to turn on the ambient lights and music before cooking dinner and this task is detected to be repeated several times, then the "IfMe" application can automatically activate or offer to activate this task for the user when s/he enters the kitchen and when the kitchen is dark. As another example, if the user has a meeting early morning and the traffic is unusually bad, then the "IfMe" application can help to adjust the wake-up alarm to be 15 minutes earlier to account for the traffic update forecasted that morning, so the user doesn't arrive late to his/her meeting.

Figure 25:
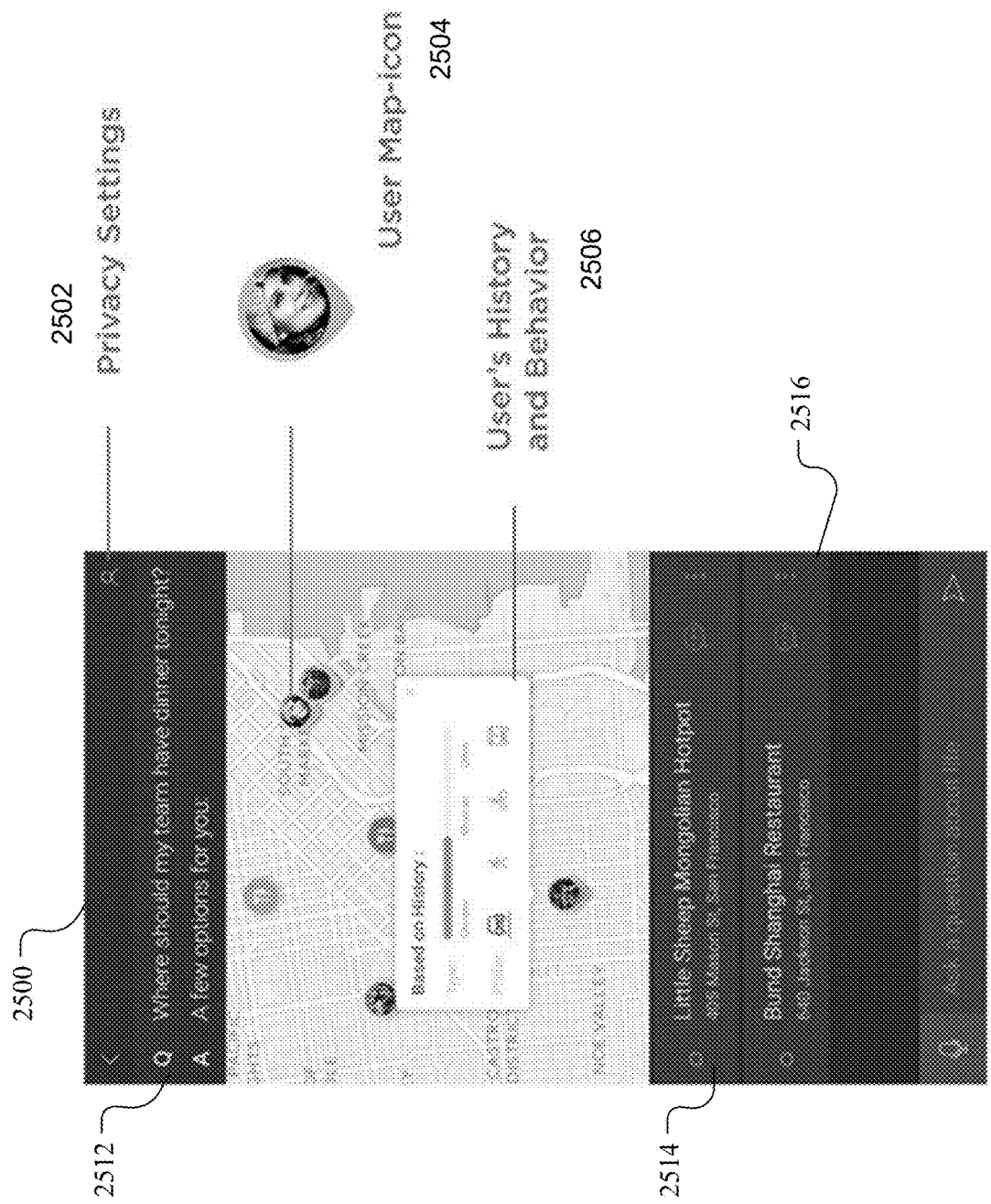
FIG. 25 illustrates an example user interface for responding to questions involving social recommendations.

FIG. 25 illustrates an example user interface 2500 for response to social recommendation type of questions. In particular embodiments, the system may answer a question by making a social recommendation for a situation involving more than one person. For example, if the question is "where should my team have dinner tonight?", the interface can show an answer derived from the team member locations, preferences, and commute methods. The user interface 2500 may include user map-icons (e.g., 2504) containing intuitive information about each user's current location and his/her preferences. Since the color around the profile icon may reflect each individual's preferred restaurants by type, the user can get a basic idea of which type is suitable for the group by simply looking at the map. The interface may also allow the user to tap each user's map icon to access more detailed information about the selected user's relevant information related to the search (e.g., user's history and behaviors 2506).

Since this information can be privacy sensitive, the user interface 2500 may include multiple controls (e.g., privacy settings 2502) to prevent privacy breaches. First, the sensor data is only privately shared at certain periods of time. Second, the data shared is based on user preferences for share-able data. Therefore, the group interaction is a safe channel only shared within the group of users.

The user interface 2500 can also offer the flexibility of allowing modifications to the user-preferences and requesting a different solution for a new situation. For example, if one of the users wishes to switch preferred food type, everyone in the group could see how this changes the group suggestion. In addition, the suggestions can be listed below the map (e.g., the region 2514) along with a chat button 2516 that allows the group users to begin a discussion. Finally, the user interface 2500 may integrate an expandable action button to help users easily act on their preferred suggestions.

Although examples using on-board mobile sensors are described herein, the disclosed technology (e.g., the Sense+ platform) can be extended to other sensors, such as external sensors. For example, data from one or more wearable devices (e.g., smartwatch, smart band, AR/VR glasses, head mounted displays, etc.) can be used as well. In some embodiments, acquired or collected sensor information (including external sensor data) can be displayed across various platforms as well.

Figure 26:
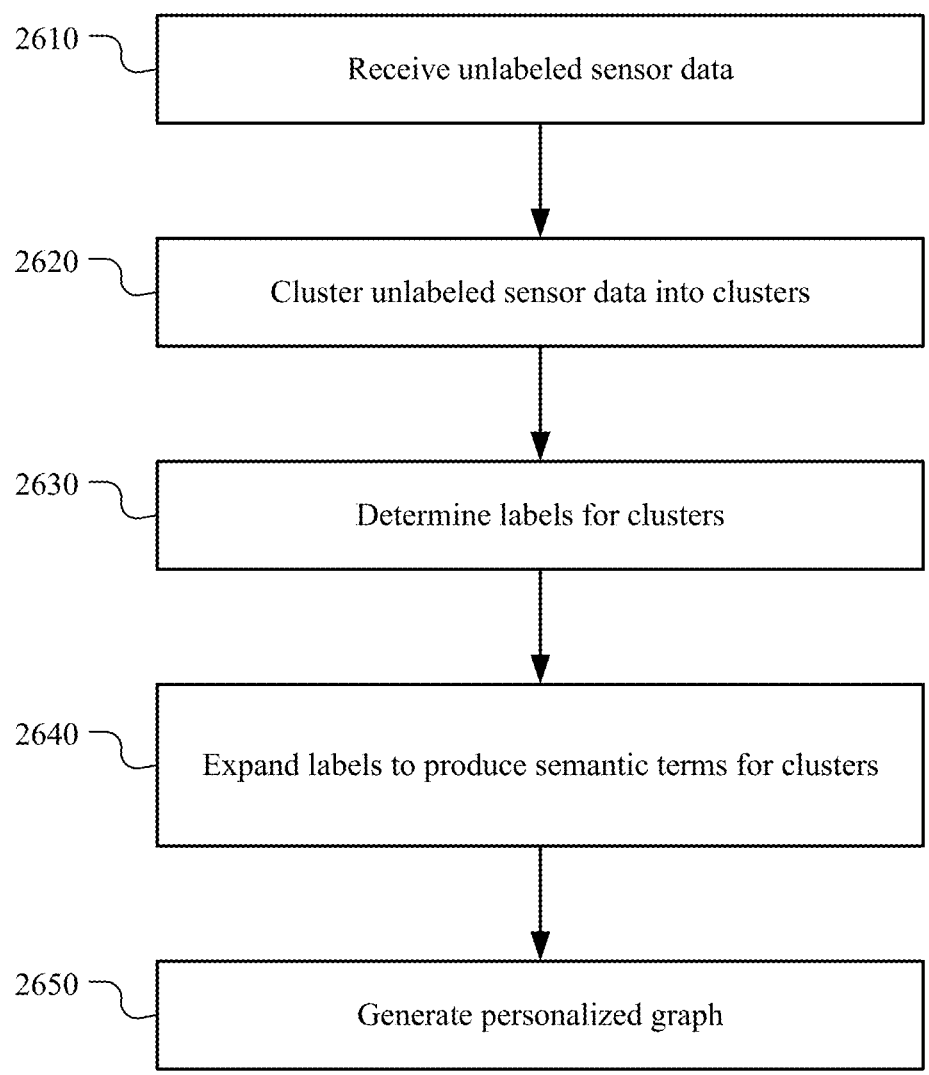
FIG. 26 illustrate an example method for generating personalized graphs based on clustered sensor data.

FIG. 26 illustrate an example method 2600 for generating personalized graphs based on clustered sensor data. The method may start at step 2610, where the system may receive unlabeled data from one or more sensors associated with a mobile device of a user. The sensors may be build-in sensors of the mobile device or accessory sensors associated with the mobile device. The sensor may include, for example, but are not limited to, GPS sensors, Bluetooth sensors, near field communication (NFC) sensors, motion sensors, accelerometers, gyroscopes, magnetometers, humidity sensors, temperature sensors, barometers, cameras, microphones, light sensor, fingerprint sensors, bio-sensors for identification, heart rate sensors, etc. The system may further collect unlabeled data related to device battery status, device screen status, user touch inputs, application activities, device states (e.g., in use, standby), device communication states (e.g., idle, in use), environmental status (e.g., weather, sunrise/sunset, temperature, humidity), etc. The received sensor data may be data that is not pre-labeled by human. At step 2620, the system may cluster the unlabeled data into one or more unlabeled clusters. The system may first use a filter algorithm to filter the unlabeled data to reduce noise. Then, the system may partition the unlabeled data into segments based on a maximum likelihood estimation. After that, the system may identify the critical points (e.g., turning points) between the segments. At last, the system may simplify the plurality of segments into a geometric shape based on the identified turning points. The system may approximate the geometric shape to a number geometric shapes in a shape dictionary and include the unlabeled data related to a same geometric shape in a same unlabeled cluster.

At step 2630, the system may determine, based on one or more rules, labels for the unlabeled clusters. The label of each unlabeled cluster may be determined based on a reverse geocoding process, an activity detection process, an object tracking process, a time sensing process, or a rule-based-reasoning process. The system may determine one or more semantic links between two or more labeled clusters. The semantic links may be used to match a query input to a databased store including the data clusters.

At step 2640, the system may expand, by a natural language processing algorithm, the labels of clusters to produce one or more semantic terms associated with the clusters. At step 2650, the system may generate, based on the one or more semantic terms, a personalized graph associated with one or more behavioral patterns of the user. The system may generate a semantic model which may be used to generate the personalized graph. In particular embodiments, the system may extract features from the unlabeled data based on multi-level modeling and using an unsupervised machine learning algorithm. The system may generate a sensor model using a sensor fusion algorithm based on the extracted features. The sensor model may be used to generate the semantic model. The system may receive a query input to query the personalized graph which includes a semantic text graph. The system may match the query input to one or more concept nodes of the personalize graph based on one or more semantic links between the concept nodes of the personalized graph.

In particular embodiments, the system may parse the query input into a structured language object using a language graph. The language graph may be a projective language graph or a non-projective language graph. The system may identify a query type by passing through a plurality of layers of heuristics and match the query input to one or more data stores based on the identified query type. The system may generate a query input vector based on the structured language object by linking a plurality of natural language elements through semantic relevancy. The system may reduce the dimensionality of the query input vector to match a soft clustering vector space dimensionality and identify matching nodes in the personalized graph. The matching nodes may match the query input vector through semantic relevancy. The system may calculate a similarity score between each two of the plurality of matching nodes, eliminate outlier nodes of the matching nodes based on the corresponding similarity scores, and filter the matching nodes into a set of matching nodes based on one or more user-defined terms into a smaller set of nodes.

In particular embodiments, the system may dynamically rank the set of matching nodes based on one or more relevant terms of the query input, a semantic model, or the query type. The system may search a sensor node database using a recursive algorithm based on one or more searching parameters including, for example, but not limited to, an object type, a time target, an object unique identifier (UID), an object ranking, or a response relevant term. The system may generate a response to the query input in a natural language form and present the response to the user through a question answer system user interface. The system may receive one or more user interactions for utilizing the personalized graph and updating the personalized graph based on the one or more user interactions. In particular embodiments, the system may perform all possible steps locally and exclusively on a mobile device and keep the sensor data and processing result locally on the mobile device. In particular embodiments, the system may use the data graph which include semantic information rather than raw sensor data as a compression method to collect and store data. The data graph with semantic words, terms, and numbers may have a smaller size and higher information density than the raw sensor data.

Particular embodiments may repeat one or more steps of the method of FIG. 26, where appropriate. Although this disclosure describes and illustrates particular steps of the method of FIG. 26 as occurring in a particular order, this disclosure contemplates any suitable steps of the method of FIG. 26 occurring in any suitable order. Moreover, although this disclosure describes and illustrates an example method for generating personalized graphs based on clustered sensor data including the particular steps of the method of FIG. 26, this disclosure contemplates any suitable method for generating personalized graphs based on clustered sensor data including any suitable steps, which may include all, some, or none of the steps of the method of FIG. 26, where appropriate. Furthermore, although this disclosure describes and illustrates particular components, devices, or systems carrying out particular steps of the method of FIG. 26, this disclosure contemplates any suitable combination of any suitable components, devices, or systems carrying out any suitable steps of the method of FIG. 26.

Figure 27:
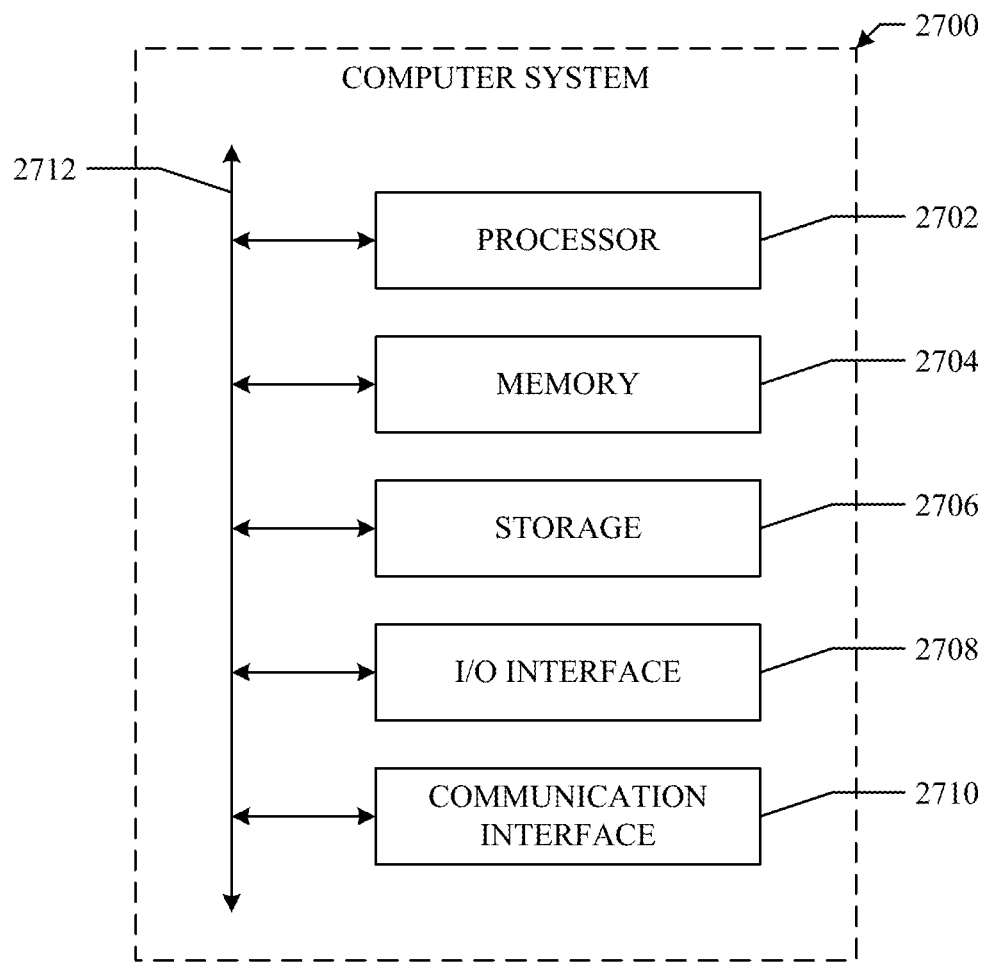
FIG. 27 illustrates an example computer system.

FIG. 27 illustrates an example computer system 2700. In particular embodiments, one or more computer systems 2700 perform one or more steps of one or more methods described or illustrated herein. In particular embodiments, one or more computer systems 2700 provide functionality described or illustrated herein. In particular embodiments, software running on one or more computer systems 2700 performs one or more steps of one or more methods described or illustrated herein or provides functionality described or illustrated herein. Particular embodiments include one or more portions of one or more computer systems 2700. Herein, reference to a computer system may encompass a computing device, and vice versa, where appropriate. Moreover, reference to a computer system may encompass one or more computer systems, where appropriate.

This disclosure contemplates any suitable number of computer systems 2700. This disclosure contemplates computer system 2700 taking any suitable physical form. As example and not by way of limitation, computer system 2700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2700 may include one or more computer systems 2700; be unitary or distributed; span multiple locations; span multiple machines; span multiple data centers; or reside in a cloud, which may include one or more cloud components in one or more networks. Where appropriate, one or more computer systems 2700 may perform without substantial spatial or temporal limitation one or more steps of one or more methods described or illustrated herein. As an example and not by way of limitation, one or more computer systems 2700 may perform in real time or in batch mode one or more steps of one or more methods described or illustrated herein. One or more computer systems 2700 may perform at different times or at different locations one or more steps of one or more methods described or illustrated herein, where appropriate.

In particular embodiments, computer system 2700 includes a processor 2702, memory 2704, storage 2706, an input/output (I/O) interface 2708, a communication interface 2710, and a bus 2712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2702 includes hardware for executing instructions, such as those making up a computer program. As an example and not by way of limitation, to execute instructions, processor 2702 may retrieve (or fetch) the instructions from an internal register, an internal cache, memory 2704, or storage 2706; decode and execute them; and then write one or more results to an internal register, an internal cache, memory 2704, or storage 2706. In particular embodiments, processor 2702 may include one or more internal caches for data, instructions, or addresses. This disclosure contemplates processor 2702 including any suitable number of any suitable internal caches, where appropriate. As an example and not by way of limitation, processor 2702 may include one or more instruction caches, one or more data caches, and one or more translation lookaside buffers (TLBs). Instructions in the instruction caches may be copies of instructions in memory 2704 or storage 2706, and the instruction caches may speed up retrieval of those instructions by processor 2702. Data in the data caches may be copies of data in memory 2704 or storage 2706 for instructions executing at processor 2702 to operate on; the results of previous instructions executed at processor 2702 for access by subsequent instructions executing at processor 2702 or for writing to memory 2704 or storage 2706; or other suitable data. The data caches may speed up read or write operations by processor 2702. The TLBs may speed up virtual-address translation for processor 2702. In particular embodiments, processor 2702 may include one or more internal registers for data, instructions, or addresses. This disclosure contemplates processor 2702 including any suitable number of any suitable internal registers, where appropriate. Where appropriate, processor 2702 may include one or more arithmetic logic units (ALUs); be a multi-core processor; or include one or more processors 2702. Although this disclosure describes and illustrates a particular processor, this disclosure contemplates any suitable processor.

In particular embodiments, memory 2704 includes main memory for storing instructions for processor 2702 to execute or data for processor 2702 to operate on. As an example and not by way of limitation, computer system 2700 may load instructions from storage 2706 or another source (such as, for example, another computer system 2700) to memory 2704. Processor 2702 may then load the instructions from memory 2704 to an internal register or internal cache. To execute the instructions, processor 2702 may retrieve the instructions from the internal register or internal cache and decode them. During or after execution of the instructions, processor 2702 may write one or more results (which may be intermediate or final results) to the internal register or internal cache. Processor 2702 may then write one or more of those results to memory 2704. In particular embodiments, processor 2702 executes only instructions in one or more internal registers or internal caches or in memory 2704 (as opposed to storage 2706 or elsewhere) and operates only on data in one or more internal registers or internal caches or in memory 2704 (as opposed to storage 2706 or elsewhere). One or more memory buses (which may each include an address bus and a data bus) may couple processor 2702 to memory 2704. Bus 2712 may include one or more memory buses, as described below. In particular embodiments, one or more memory management units (MMUs) reside between processor 2702 and memory 2704 and facilitate accesses to memory 2704 requested by processor 2702. In particular embodiments, memory 2704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2704 may include one or more memories 2704, where appropriate. Although this disclosure describes and illustrates particular memory, this disclosure contemplates any suitable memory.

In particular embodiments, storage 2706 includes mass storage for data or instructions. As an example and not by way of limitation, storage 2706 may include a hard disk drive (HDD), a floppy disk drive, flash memory, an optical disc, a magneto-optical disc, magnetic tape, or a Universal Serial Bus (USB) drive or a combination of two or more of these. Storage 2706 may include removable or non-removable (or fixed) media, where appropriate. Storage 2706 may be internal or external to computer system 2700, where appropriate. In particular embodiments, storage 2706 is non-volatile, solid-state memory. In particular embodiments, storage 2706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2706 taking any suitable physical form. Storage 2706 may include one or more storage control units facilitating communication between processor 2702 and storage 2706, where appropriate. Where appropriate, storage 2706 may include one or more storages 2706. Although this disclosure describes and illustrates particular storage, this disclosure contemplates any suitable storage.

In particular embodiments, I/O interface 2708 includes hardware, software, or both, providing one or more interfaces for communication between computer system 2700 and one or more I/O devices. Computer system 2700 may include one or more of these I/O devices, where appropriate. One or more of these I/O devices may enable communication between a person and computer system 2700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2708 for them. Where appropriate, I/O interface 2708 may include one or more device or software drivers enabling processor 2702 to drive one or more of these I/O devices. I/O interface 2708 may include one or more I/O interfaces 2708, where appropriate. Although this disclosure describes and illustrates a particular I/O interface, this disclosure contemplates any suitable I/O interface.

In particular embodiments, communication interface 2710 includes hardware, software, or both providing one or more interfaces for communication (such as, for example, packet-based communication) between computer system 2700 and one or more other computer systems 2700 or one or more networks. As an example and not by way of limitation, communication interface 2710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2710 for it. As an example and not by way of limitation, computer system 2700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2700 may include any suitable communication interface 2710 for any of these networks, where appropriate. Communication interface 2710 may include one or more communication interfaces 2710, where appropriate. Although this disclosure describes and illustrates a particular communication interface, this disclosure contemplates any suitable communication interface.

In particular embodiments, bus 2712 includes hardware, software, or both coupling components of computer system 2700 to each other. As an example and not by way of limitation, bus 2712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2712 may include one or more buses 2712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
receiving unlabeled data with arbitrary time intervals over time from one or more sensors of a mobile client device associated with a user;
clustering the unlabeled data into one or more unlabeled clusters based on a characteristic of an activity of the user associated with the unlabeled data, wherein the characteristic of the activity of the user comprises a spatial-temporal distribution pattern of the unlabeled data based on the arbitrary time intervals;
determining, based on one or more rules and the characteristic of the activity of the user, at least one label for at least one unlabeled cluster of the one or more unlabeled clusters;
expanding, by a natural language processing algorithm, the at least one label for the at least one unlabeled cluster to produce one or more semantic terms associated with the at least one unlabeled cluster; and
generating, based on the one or more semantic terms, a personalized graph associated with one or more behavioral patterns of the user, wherein the personalized graph comprises a plurality of nodes connected by a plurality of edges representing relationships between the nodes, wherein each edge is associated with a weight factor that is dynamically updated based on relevancy of corresponding nodes connected by that edge, and wherein at least one of the one or more behavior patterns is associated with the activity of the user.

2. The method of claim 1, wherein receiving unlabeled data, clustering the unlabeled data, determining the at least one label, expanding the at least one label, and generating the personalized graph are performed locally by the computing device of the user.

3. The method of claim 1, wherein clustering the unlabeled data comprises:
filtering the unlabeled data to reduce noise in the unlabeled data using a filtering algorithm;
partitioning the unlabeled data into a plurality of segments based on a maximum likelihood estimation;
identifying a plurality of turning points between the plurality of segments; and
simplifying the plurality of segments into a geometric shape based on the identified plurality of turning points.

4. The method of claim 3, further comprising:
comparing the geometric shape to a plurality of geometric shapes in a shape dictionary;
selecting, based on the comparison, one or more of the geometric shapes in the shape dictionary; and
including the unlabeled data partitioned into the plurality of segments in one or more unlabeled clusters associated with the one or more geometric shapes in the shape dictionary.

5. The method of claim 1, wherein the at least one label is determined based on one or more of: a reverse geocoding process, an activity detection process, an object tracking process, a time sensing process, or a rule-based-reasoning process, and wherein the at least one label is associated with the activity of the user.

6. The method of claim 5, further comprising:
determining one or more semantic links between two or more labeled clusters, wherein the semantic links match a query input to a database storing the two or more labeled clusters.

7. The method of claim 1, further comprising:
generating, locally at the computing device of the user, a semantic model, wherein the personalized graph is generated based on the semantic model.

8. The method of claim 7, further comprising:
extracting features from the unlabeled data based on multi-level modeling by an unsupervised machine learning algorithm; and
generating a sensor model using a sensor fusion algorithm based on the extracted features, wherein the semantic model is generated based on the sensor model, and wherein one or more nodes of the plurality of nodes of the personalized graph are associated with the activity of the user.

9. The method of claim 1, further comprising:
receiving a query input to query the personalized graph, wherein the personalized graph includes a semantic text graph; and
matching the query input to one or more nodes of the plurality of nodes of the personalized graph based on one or more semantic links between the plurality of nodes of the personalized graph.

10. The method of claim 9, further comprising:
parsing the query input into a structured language object using a language graph, wherein the language graph is a projective language graph or a non-projective language graph.

11. The method of claim 10, further comprising:
identifying a query type by passing through a plurality of layers of heuristics; and
matching the query input to one or more databases data stores based on the identified query type.

12. The method of claim 11, further comprising:
generating a query input vector based on the query input and the structured language object by linking a plurality of natural language elements associated with the query input and the structured language object through semantic relevancy.

13. The method of claim 12, further comprising:
reducing a dimensionality of the query input vector to match a soft clustering vector space dimensionality; and
identifying a plurality of matching nodes in the personalized graph, wherein the plurality of matching nodes match the query input vector through semantic relevancy.

14. The method of claim 13, further comprising:
calculating a similarity score between each node of the plurality of matching nodes and every other node of the plurality of matching nodes;
eliminating outlier nodes of the plurality of matching nodes based on the similarity scores; and
filtering the plurality of matching nodes into a set of matching nodes based on one or more user-defined terms, wherein the set of matching nodes has less nodes than the plurality of matching nodes.

15. The method of claim 14, further comprising:
dynamically ranking the set of matching nodes based on one or more relevant terms of the query input, a semantic model, or the query type.

16. The method of claim 14, further comprising:
searching a sensor node database using a recursive algorithm based on one or more searching parameters, wherein the searching parameters comprise one or more of:
an object type;
a time target;
an object unique identifier (UID);
an object ranking; or
a response relevant term.

17. The method of claim 14, further comprising:
generating a response to the query input in a natural language form; and
presenting the response to the user through a question-answer system user interface.

18. The method of claim 1, further comprising:
receiving one or more user interactions for utilizing the personalized graph; and
updating the personalized graph based on the one or more user interactions.

19. One or more computer-readable non-transitory storage media embodying software that is operable when executed to:
receive unlabeled data with arbitrary time intervals over time from one or more sensors of a mobile client device associated with a user;
cluster the unlabeled data into one or more unlabeled clusters based on a characteristic of an activity of the user associated with the unlabeled data, wherein the characteristic of the activity of the user comprises a spatial-temporal distribution pattern of the unlabeled data based on the arbitrary time intervals;
determine, based on one or more rules and the characteristic of the activity of the user, at least one label for at least one unlabeled cluster of the one or more unlabeled clusters;
expand, by a natural language processing algorithm, the at least one label for the at least one unlabeled cluster to produce one or more semantic terms associated with the at least one unlabeled cluster; and
generate, based on the one or more semantic terms, a personalized graph associated with one or more behavioral patterns of the user, wherein the personalized graph comprises a plurality of nodes connected by a plurality of edges representing relationships between the nodes, wherein each edge is associated with a weight factor that is dynamically updated based on relevancy of corresponding nodes connected by that edge, and wherein at least one of the one or more behavior patterns is associated with the activity of the user.

20. A system comprising:
one or more processors; and
a non-transitory memory coupled to the processors comprising instructions executable by the processors, the processors operable when executing the instructions to:
receive unlabeled data with arbitrary time intervals over time from one or more sensors of a mobile client device associated with a user;
cluster the unlabeled data into one or more unlabeled clusters based on a characteristic of an activity of the user associated with the unlabeled data, wherein the characteristic of the activity of the user comprises a spatial-temporal distribution pattern of the unlabeled data based on the arbitrary time intervals;
determine, based on one or more rules and the characteristic of the activity of the user, at least one label for at least one unlabeled cluster of the one or more unlabeled clusters;
expand, by a natural language processing algorithm, the at least one label for the at least one unlabeled cluster to produce one or more semantic terms associated with the at least one unlabeled cluster; and
generate, based on the one or more semantic terms, a personalized graph associated with one or more behavioral patterns of the user, wherein the personalized graph comprises a plurality of nodes connected by a plurality of edges representing relationships between the nodes, wherein each edge is associated with a weight factor that is dynamically updated based on relevancy of corresponding nodes connected by that edge, and wherein at least one of the one or more behavior patterns is associated with the activity of the user.

* * * * *